(12) United States Patent
Liang et al.

(10) Patent No.: US 12,160,794 B2
(45) Date of Patent: *Dec. 3, 2024

(54) USING ON-LINE AND OFF-LINE PROJECTIONS TO CONTROL INFORMATION DELIVERY TO MOBILE DEVICES

(71) Applicant: xAd, Inc., New York, NY (US)

(72) Inventors: Can Liang, Sunnyvale, CA (US); Huitao Luo, Fremont, CA (US); Shashi Seth, Mountain View, CA (US); Hari Venkatesan, Cupertino, CA (US); Sunil Kumar, Brooklyn, NY (US); Vimpy Batra, Mountain View, CA (US); Richard Chiou, San Jose, CA (US); Pravesh Katyal, Mountain View, CA (US)

(73) Assignee: xAd, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,887

(22) Filed: Jun. 21, 2022

(65) Prior Publication Data

US 2022/0408222 A1    Dec. 22, 2022

Related U.S. Application Data

(63) Continuation-in-part of application No. 16/874,674, filed on May 14, 2020, now Pat. No. 11,367,102.
(Continued)

(51) Int. Cl.
*G06F 16/00* (2019.01)
*G06F 16/903* (2019.01)
(Continued)

(52) U.S. Cl.
CPC ...... *H04W 4/029* (2018.02); *G06F 16/90335* (2019.01); *G06F 16/909* (2019.01)

(58) Field of Classification Search
CPC . H04W 4/029; G06F 16/909; G06F 16/90335
See application file for complete search history.

(56) References Cited

U.S. PATENT DOCUMENTS

| | | | |
|---|---|---|---|
| 2012/0209706 A1* | 8/2012 | Ramer | G06Q 30/02 705/14.51 |
| 2015/0332329 A1* | 11/2015 | Luo | G06F 16/29 705/14.58 |
| 2016/0048869 A1* | 2/2016 | Shim | G06Q 30/0246 705/14.45 |

* cited by examiner

*Primary Examiner* — Tyler J Torgrimson
(74) *Attorney, Agent, or Firm* — USCH Law, PC

(57) ABSTRACT

A system for processing information requests associated with mobile devices comprises an evaluation module configured to determine at least one performance measure for each of a plurality of information documents using at least data in one or both of a requests database and events database. The at least one performance measure includes at least one of an impression-based performance measure, a click/call-based performance measure, and an off-line site-visit-based performance measure. The system further comprises an information server configured to select a first information document for transmitting to a first mobile device to fulfill a first request. The information server includes a volume control unit configured to derive an off-line site visit projection in response to the first document being selected based at least in part on an off-line site-visit-based performance measure and having been impressed on the first mobile device, and to adjust a budget associated with the first document using the off-line site visit projection.

20 Claims, 30 Drawing Sheets

Related U.S. Application Data which is a continuation-in-part of application No. 15/919,197, filed on Mar. 12, 2018, now Pat. No. 10,762,141, and a continuation-in-part of application No. 15/289,104, filed on Oct. 7, 2016, now abandoned.

(60) Provisional application No. 62/470,119, filed on Mar. 10, 2017, provisional application No. 62/353,036, filed on Jun. 22, 2016, provisional application No. 62/238,122, filed on Oct. 7, 2015.

(51) Int. Cl.
*G06F 16/909* (2019.01)
*H04W 4/029* (2018.01)

| Name/Brand | Category | Place Identifier | Place Type | Spatial Index | Doc ID |
|---|---|---|---|---|---|
| Costco | General | US/CA/Almaden | BC | a1, a2, ..., ai | 132475 |
| Costco | General | US/CA/Almaden | BP | b1, b2, ..., bj | 135678 |
| Costco | General | US/CA/Almaden | BR | c1, c2, ..., ck | 136572 |
| T.J Maxx | Department | US/CA/Almaden | BC | d1, d2, ..., dl | 156321 |
| T.J Maxx | Department | US/CA/Almaden | BP | e1, e2, ..., em | 154376 |
| T.J Maxx | Department | US/CA/Almaden | BR | c1, c2, ..., ck | 157643 |
| Trader Joe's | Grocery | US/CA/Almaden | BC | f1, f2, ..., fn | 256321 |
| ...... | ...... | ...... | | ...... | |

FIG. 2C

| Geo-Bock ID | Spatial Index | Meta Data | | | | |
|---|---|---|---|---|---|---|
| | | City/State | Functionality | Major POI | Demographic | inventory |
| ...... | ...... | ...... | ...... | ...... | ...... | ...... |
| 1234568 | a1, a2, ..., ai | Santa Clara/CA | Residential | Santa Clara High School | ...... | ...... |
| 1234569 | b1, b2, ..., bj | Santa Clara/CA | Retail | New India Bazar | ...... | ...... |
| 1234570 | c1, c2, ..., ck | Santa Clara/CA | Residential | Pomeroy Elementary | ...... | ...... |
| 1234571 | d1, d2, ..., dl | Santa Clara/CA | Retail | Moonlight Shopping Center | ...... | ...... |
| ...... | ...... | ...... | ...... | ...... | ...... | ...... |
| 1234573 | f1, f2, ..., fn | Santa Clara/CA | Recreational | Branham Park | ...... | ...... |
| ...... | ...... | ...... | ...... | ...... | ...... | ...... |

FIG. 2E

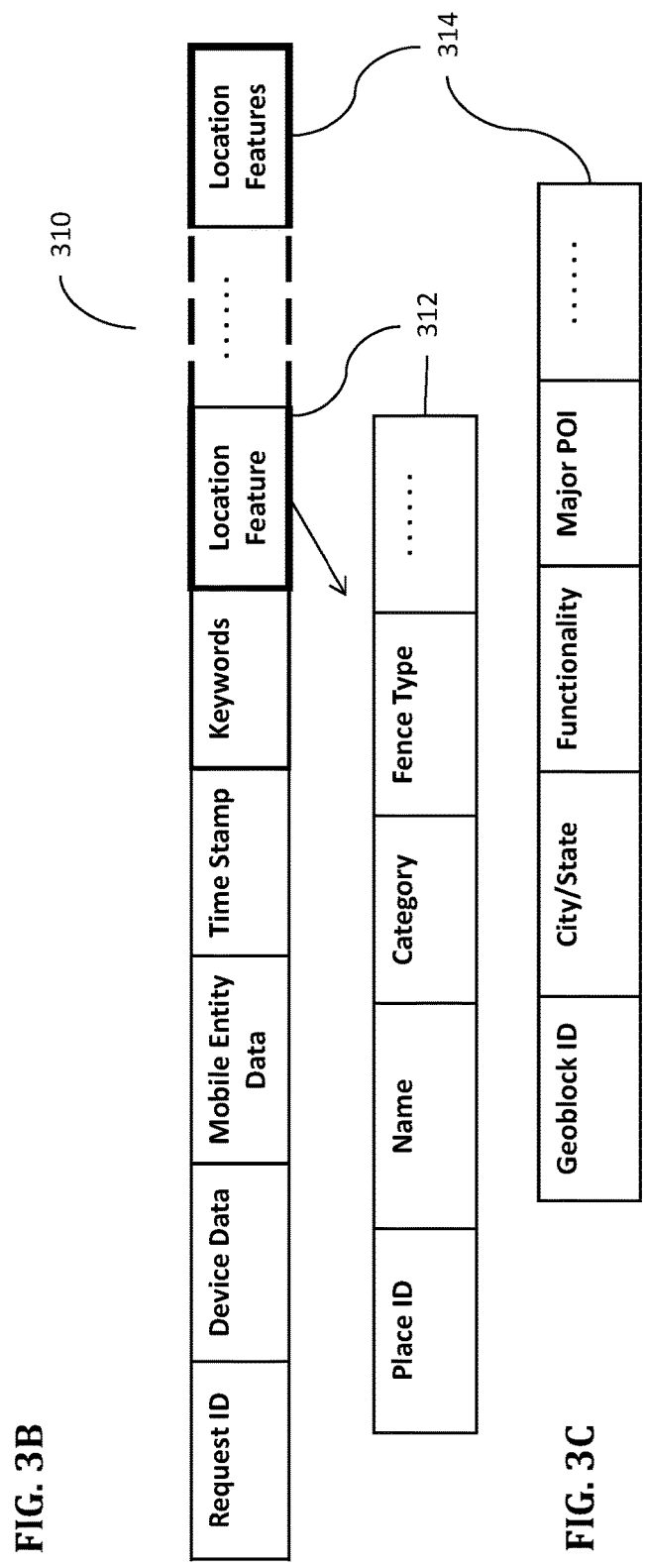

| Packet ID | Device Information | | User Information | | | | Location Information | | Time Stamp | |
|---|---|---|---|---|---|---|---|---|---|---|
| | UID | Make/Model | Age | Gender | Other Info | | Site Name | Place Type | Day | Hour |
| 0136819976 | 22***369 | Iphone 4 | 22 | F | C/U | | Null | Null | 3/1/2017 | 12:55 |
| 0136819975 | 56***845 | Iphone 5 | 47 | F | HS | | B123 | Y | 3/1/2017 | 12:53 |
| 0136819974 | 36***963 | Nokia 2300 | 25 | M | C/U | | B118 | Y | 3/1/2017 | 12:53 |
| 0136819973 | 45***895 | Nokia 4566 | 36 | F | HS | | Null | Null | 3/1/2017 | 12:52 |
| 0136819972 | 36***412 | Samsung 1179 | 23 | M | G/S | | B165 | Z | 3/1/2017 | 12:51 |
| ... | ... | ... | ... | ... | ... | | ... | ... | ... | ... |
| | 78***697 | Samsung 1179 | 42 | F | C/U | | B148 | Y | 2/24/2017 | 10:31 |
| 0125785237 | 56***845 | Iphone 5 | 47 | F | HS | | Null | Null | 2/24/2017 | 10:30 |

FIG. 3D

| Mobile Entity Data | | | Doc ID: ###-###-### | Name/Brand/Category: XXXXXXX | KPI Base/Price: XX/##### | | | | | | | | | | |
|---|---|---|---|---|---|---|---|---|---|---|---|---|---|---|---|
| | | | 512 | | 522 | | | | 532 | | | | 542 | | |
| | | | Impression | | Click/Call | | Click/Call | | S/A | | S/A | | Visit | | Visit |
| UID | Age | Gen | Day | Hour | Day | Hour | Day | Hour | Day | Hour | Day | Hour | Day | Hour | Day | Hour |
| ######## | ## | X | ##/## | ##:## | ##/## | ##:## | | | | | | | | | | |
| ######## | ## | X | ##/## | ##:## | ##/## | ##:## | | | ##/## | ##:## | | | | | | |
| ######## | ## | X | ##/## | ##:## | | | | | | | | | ##/## | ##:## | ##/## | ##:## |

FIG. 5B

| Request ID | Device Information | | User Information | | | | Location Information | | Time of Request | | Fulfillment | | SV? |
|---|---|---|---|---|---|---|---|---|---|---|---|---|---|
| | UID | Make/Model | Age | Gender | Other Info | | Business Name | Place Type | Day | Hour | DocID | Imp | |
| 0136819976 | 22***369 | Iphone 4 | 22 | F | C/U | | B289 | X | 3/1/2017 | 12:55 | D0123 | Yes | Yes |
| 0136819975 | **56\*\*\*845 | Iphone 5 | 47 | F | HS | | B123 | Y | 3/1/2017 | 12:53 | D0321 | No | Yes** |
| 0136819974 | 36***963 | Nokia 2300 | 25 | M | C/U | | B118 | Y | 3/1/2017 | 12:53 | D4325 | No | No |
| 0136819973 | 45***895 | Nokia 4566 | 36 | F | HS | | B279 | Z | 3/1/2017 | 12:52 | D0237 | Yes | No |
| 0136819972 | 36***412 | Samsung 1179 | 23 | M | G/S | | B165 | Z | 3/1/2017 | 12:51 | D0892 | No | No |
| ... | ... | ... | ... | ... | ... | | ... | ... | ... | ... | | | |
| | 78***697 | Samsung 1179 | 42 | F | C/U | | B148 | Y | 2/24/2017 | 10:31 | D7438 | No | Yes |
| 0125785237 | **56\*\*\*845 | Iphone 5 | 47 | F | HS | | B337 | X | 2/24/2017 | 10:30 | D2765 | Yes | No** |

FIG. 6B

| Geo-Block ID: ######### | City/State: XXXXX/XX | Function: XXXXXX | Major POI: XXXXXX | ....... | | | | | | | | | | | | |
|---|---|---|---|---|---|---|---|---|---|---|---|---|---|---|---|---|
| Mobile Entity Data | | | | Requests (1122) | | | | | | | | Visits/Clicks/Sas (1132) | | | | |
| UID | Age | Gen | Time Stamp | | Geo Block | Time Stamp | | Geo Block | Time Stamp | | Geo Block | ...... | Time Stamp | | Time Stamp | | ...... |
| | | | Day | Hour | | Day | Hour | | Day | Hour | | | Day | Hour | Day | Hour | |
| ########## # | ## | M | ##/## | ##:## | xxxxx | ##/## | ##:## | xxxxx | ##/## | ##:## | xxxxx | | ##/## | ##:## | | | |
| ########## # | ## | M | ##/## | ##:## | xxxxx | ##/## | ##:## | xxxxx | | | | | | | | | |
| ########## # | ## | M | ##/## | ##:## | xxxxx | ##/## | ##:## | xxxxx | | | | | ##/## | ##:## | ##/## | ##:## | |
| ...... | ... | | | | | | | | | | | Geo | | | | | |
| ...... | ... | | | | | | | | | | | | | | | | |

FIG. 11B

USING ON-LINE AND OFF-LINE PROJECTIONS TO CONTROL INFORMATION DELIVERY TO MOBILE DEVICES

CROSS REFERENCE TO RELATED APPLICATION

The present application is a continuation of U.S. patent application Ser. No. 16/874,674, filed May 14, 2020, entitled "Using On-Line and Off-Line Projections to Control Information Delivery to Mobile Devices," which is a continuation in part of U.S. patent application Ser. No. 15/919,197, filed Mar. 12, 2018, entitled "Using On-Line and Off-Line Projections to Control Information Delivery to Mobile Devices," which claims the benefit of priority to U.S. Provisional Patent Application No. 62/470,119, filed Mar. 10, 2017. U.S. patent application Ser. No. 15/919,197 is also a continuation in part of U.S. patent application Ser. No. 15/289,104, filed Oct. 7, 2016, entitled "Method and Apparatus for Measuring Effect of Information Delivered to Mobile Devices," which claims the benefit of priority of U.S. Provisional Patent Application No. 62/238,122, filed Oct. 7, 2015, and U.S. Provisional Patent Application No. 62/353,036, filed Jun. 22, 2016. Each of the above applications is incorporated herein by reference in its entirety.

FIELD

The present application is related to information technologies, and more particularly to system and method of using on-line and off-line projections to control information delivery to mobile devices.

DESCRIPTION OF THE RELATED ART

Smart phones and other forms of mobile devices are becoming more and more widely used. Nowadays, people use their mobile devices to stay connected with other people and to obtain information and services provided by mobile service providers and application developers. To keep the information and services free or low-cost, mobile service providers and application developers fund their activities at least partially by delivering sponsored information to the mobile devices that are engaging with them. The sponsored information is provided by sponsors who are interested in delivering relevant information to mobile users' mobile devices based on their locations. As a result, more and more mobile applications are designed to send location information of the mobile devices interacting with them (i.e., mobile supplies) to providers of location-based services (LBS).

To take advantage of the mobile nature of mobile phones, sophisticated computer technologies have been developed by information providers to estimate mobile device locations based on the signals they send and to select relevant and timely information to the mobile devices based on their estimated locations and other factors. Additionally, mechanisms are set up by hardware and software to track on-line activities using the mobile devices in response to the information they receive. These on-line activities have been used to derive performance measures for the delivered information and to control future information delivery. But, such performance measures are insufficient or inaccurate in many cases, especially when off-line conversions are the main responses to the delivered information.

Conventionally, panel-based approach has been used to derive off-line performance measures. This approach involves a group of users signed up as panelists, who agree to share their behaviors either by participating in surveys or by agreeing to be tracked by some software. The behaviors of the panelists exposed to sponsored information are then compared with those not exposed to the information to obtain a measurement of performance or lift. Panel-based measurement however has the following problems: (a) it requires a group of panelists; (b) the mixture of the panelists can be very different from the actual mixture of mobile users exposed to the information, causing bias in the lift analysis (for example, any targeting attribute used to select the panel can potentially cause such a bias; and (c) it is expensive to maintain a large group of panelists required in order to avoid sampling errors.

BRIEF DESCRIPTION OF THE DRAWINGS

FIG. 2C is a table illustrating examples of geo-fences stored in a geo-fence database according to certain embodiments.

FIG. 2E is a table illustrating exemplary data structures of meta data enriched geo-blocks according to certain embodiments.

FIGS. 3A-3C are block diagrams illustrating some of the content of a request at different stages of processing by the request processing system according to certain embodiments.

FIG. 3D is a table illustrating exemplary content in a location log database according to certain embodiments.

FIG. 5B is a table illustrating exemplary content in the data stores of the evaluation module according to certain embodiments.

FIG. 6B-6E are diagrams illustrating various time windows for an information campaign according to certain embodiments.

FIG. 11B is a table illustrating exemplary content in the data stores of the evaluation module according to further embodiments.

DESCRIPTION OF THE EMBODIMENTS

Figure 1A:
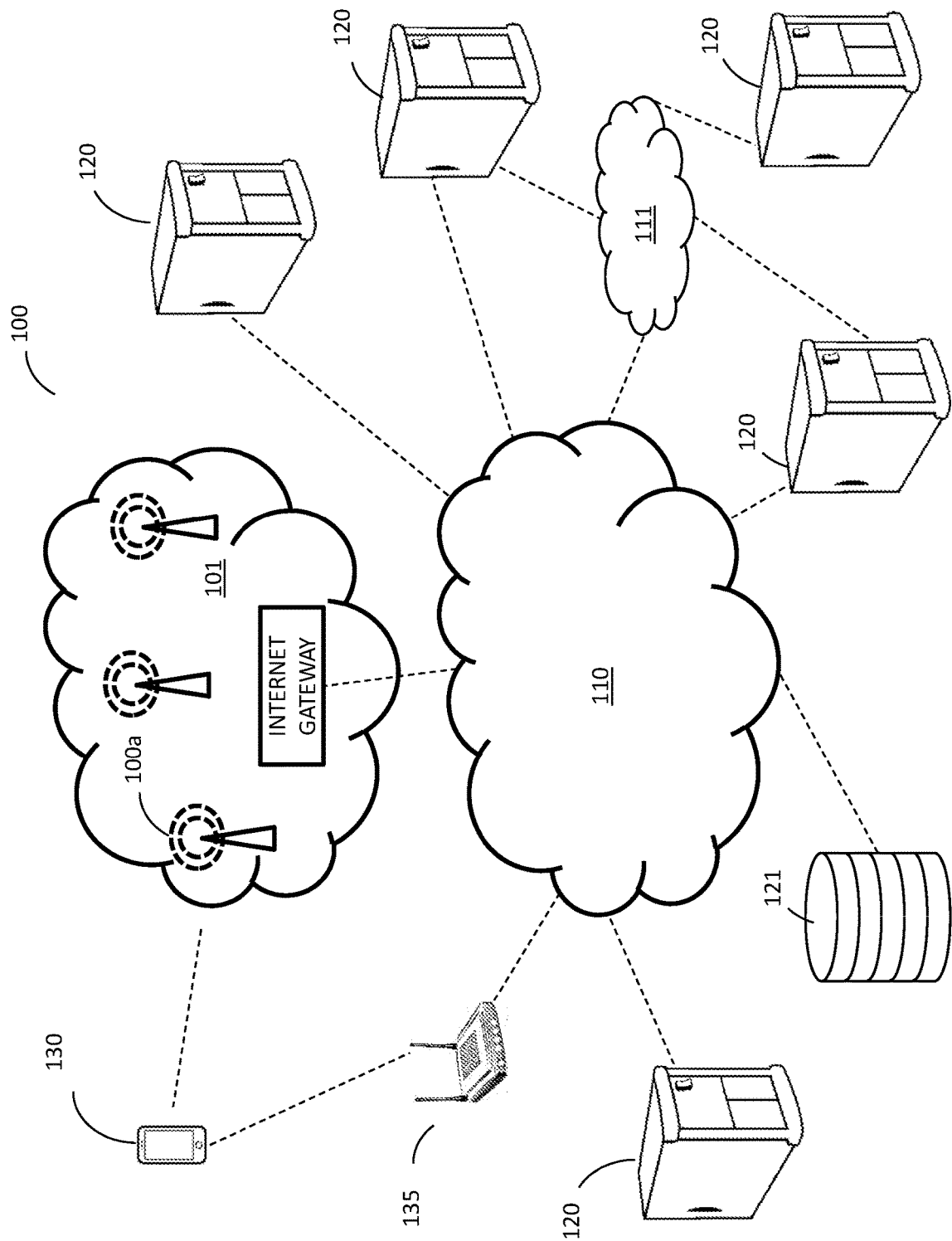
FIG. 1A is a schematic diagram illustrating an overview of an environment in which some embodiments of the disclosed technology may operate.

FIG. 1A is a schematic diagram illustrating an overview of an environment in which some embodiments of the disclosed technology may operate, and which can include one or more computer systems 120 coupled to a packet-based network 100. The packet-based network 100 in certain embodiments includes the Internet 110 and part or all of a cellular network 101 coupled to the Internet 110 via an Internet Gateway. The computers/servers 120 can be coupled to the Internet 110 using wired Ethernet and optionally Power over Ethernet (PoE), WiFi, and/or cellular connections via the cellular network 101 including a plurality of cellular towers 100a. The network may also include one or more network attached storage (NAS) systems 121, which are computer data storage servers connected to a computer network to provide data access to a heterogeneous group of clients. As shown in FIG. 1D, one or more mobile devices 130 such as smart phones or tablet computers are also coupled to the packet-based network via cellular connections to the cellular network 111. When a WiFi hotspot (such as hotspot 135) is available, a mobile device 130 may connect to the Internet 110 via a WiFi hotspot 135 using its built-in WiFi connection. Thus, the mobile devices 130 may interact with other computers/servers coupled to the Internet 110. A mobile device 130, or its user, or anyone or anything associated with it, or any combination thereof, is sometimes referred to herein as a mobile entity.

The computer/servers 120 can include server computers, client computers, personal computers (PC), tablet PC, set-top boxes (STB), personal digital assistant devices (PDA), web appliances, network routers, switches or bridges, or any computing devices capable of executing instructions that specify actions to be taken by the computing devices. As shown in FIG. 1A, some of the computers/servers 120 are coupled to each other via a local area network (LAN) 111, which in turn is coupled to the Internet 110. Also, each computer/server 120 referred herein can include any collection of computing devices that individually or jointly execute instructions to provide one or more of the systems, modules, methodologies, and functional units discussed herein.

Figure 1B:
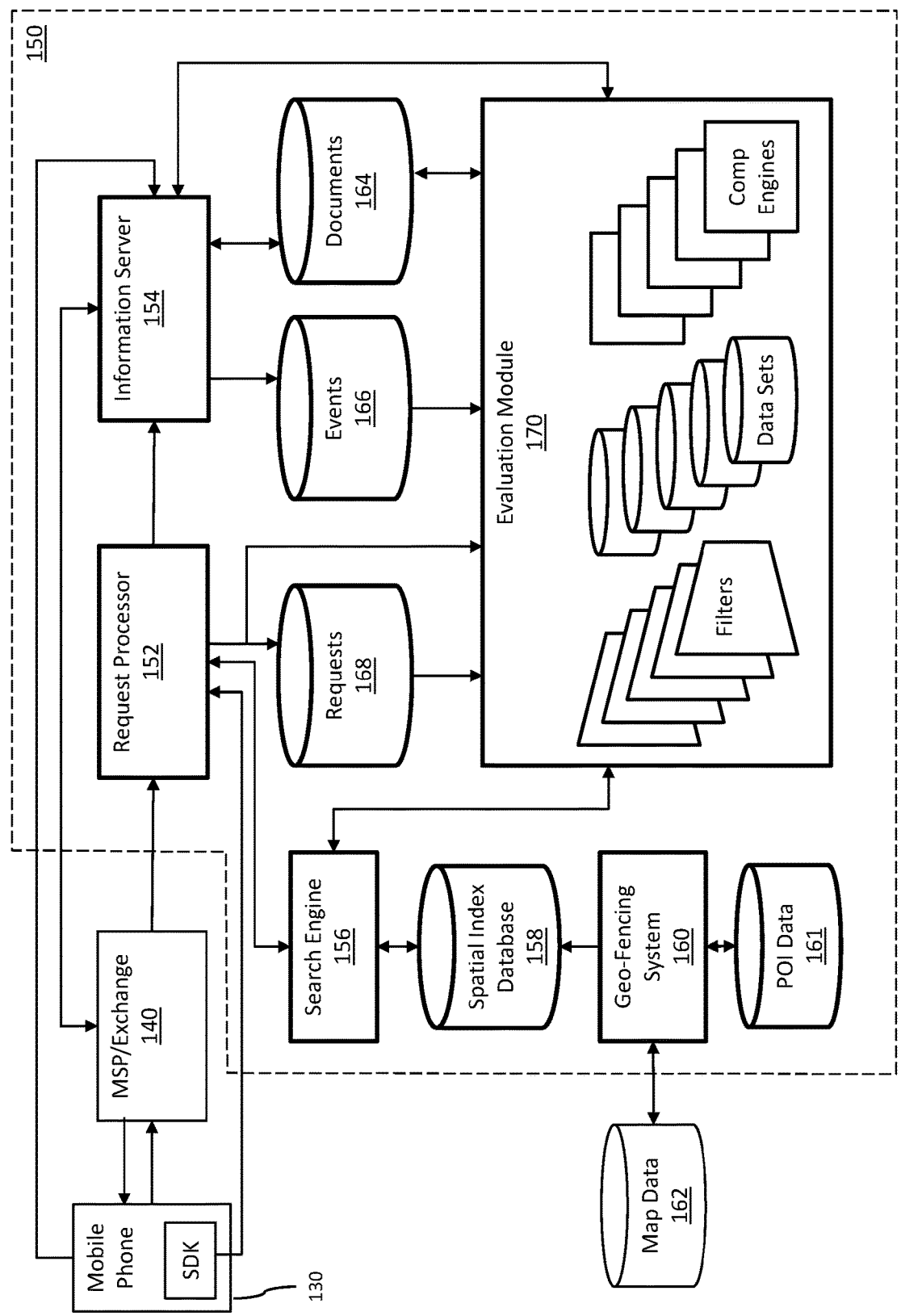
FIG. 1B is a block diagram of an information system according to certain embodiments.

As shown in FIG. 1B, the computers/servers 120 coupled to the Internet may include mobile service provider (MSP) and/or Exchange computers/servers 140 that interact with certain mobile devices 130 via software applications (apps) installed on the mobile devices 130. The MSP computers/servers 140 (referred to individually and collectively as the MSP server 140) are coupled via the network 100 to an information delivery system 150 according to certain embodiments. The system 150 can be provided by one or more of the computers/servers 120. As the MSP server 140 interacts with the mobile devices 130, it generates mobile supplies in the form of requests for sponsored information. Each request is transmitted as one or more data packets and include request data such as: a request ID, an identifier that identifies the MSP (i.e., MSP ID), identification (UID) of the mobile device (and/or its user), maker/model of the mobile device (e.g., iPhone 6S), an operating system running on the mobile device (e.g., iOS 10.0.1), certain attributes about the user or mobile entity (e.g., age, gender, income level, education level, etc.), a time stamp, and location data (e.g., a latitude/longitude pair (lat/long, or LL), zip code (ZC), city-state (CS), IP address (IP), etc. Almost all of the request data, except the MSP ID, are derived by the MSP server 140 from the signals it receives from the associated mobile device. For example, the LL may be detected by the GPS function of the associated mobile device and packaged in the data packet it sends to the MSP server 140 if the mobile device is set up to allow its location be known by the MSP server 140. The IP address may be the IP address of a WiFi router or an IP address assigned to the mobile device by a cellular network tower, via which the mobile device is interacting with the Internet. The MSP server 140 may post the mobile supplies on an Exchange for bidding by information providers or their agents, transmit the mobile supplies directly to information servers associated with information providers, or fulfill the supplies themselves.

According to certain embodiments, as shown in FIG. 1B, the system 150 includes a request processor 152 that receives and processes the requests from the MSP server or Exchange 140. In certain embodiments, the request processor 152 examines the location data in each request to determine whether they include a reliable LL pair, and if the request does not include a reliable LL pair, the request processor 152 would proceed to derive the location of the associated mobile device from other information in the location data, as described in more detail in commonly owned U.S. Pat. No. 9,886,703, issued on Feb. 6, 2018, which is incorporated herein by reference in its entirety. The detected mobile device location is input to a search engine 156, which searches in a spatial index database 158 for one or more POI places that includes the detected location and returns the search results to the request processor 152.

In certain embodiments, the system 150 further includes a geo-fencing system 160 that generates the spatial index defining geo-fences associated with the html/JavaScript files delivered by the information server 154. In certain embodiments, the geo-fencing system 160 defines virtual perimeters of defined areas that mirror real-world geographical areas for mobile advertising. A defined area according to certain embodiments can be a static circle around a business location, e.g. a fence obtained using offline index databases such as InfoUSA (www.infousa.com), which provides a list of POIs and their locations, or areas specified by marketers using predefined boundaries, such as neighborhood boundaries, school attendance zones, or parcel boundaries, etc.

In certain embodiments, the defined areas include places computed by the geo-fencing system 160 using meta-information and/or geographical information associated with the POIs. As shown in FIG. 3, the geo-fencing system 160 has access to a (POI) data 151 (e.g., InfoUSA), which provides a list of POIs and their corresponding brand names, addresses, and geographical locations. The geo-fencing system 160 also has access to publicly available map data 152 (e.g., Open Street Map at www.openstreetmap.org/), which provides information about the surroundings of the POIs in the POI directory. The geo-fencing system 160 generates definitions of one or more places in the form of, for examples, a set of geographic points defining the perimeters of one or more places for each POI.

Figure 2A:
FIG. 2A is a diagrammatic representation a simple geo-fence in the shape of a circle.

In certain embodiments, the geo-fencing system 160 generates or defines one or more places for each of a plurality of POIs in consideration of the map data around the POI. For example, as shown in FIG. 2A, a simple geo-fence for the Costco Almaden store without consideration of the map data can be in the shape of a circle 202 around the store location 201, based on the assumption that a user's intent to visit a given POI could be derived from his or her distance from the POI. However, as shown in FIG. 2A, the circle fence encompasses a major highway, a residential area, and areas on the other side of the major highway. Information about the POI served to mobile devices in these areas would most likely be ignored because people living close to the POI, people traveling on the highway, and people on the other side of the highway are either already familiar with what the POI has to offer or are unlikely to bother to respond to information related to the POI.

Figure 2B:
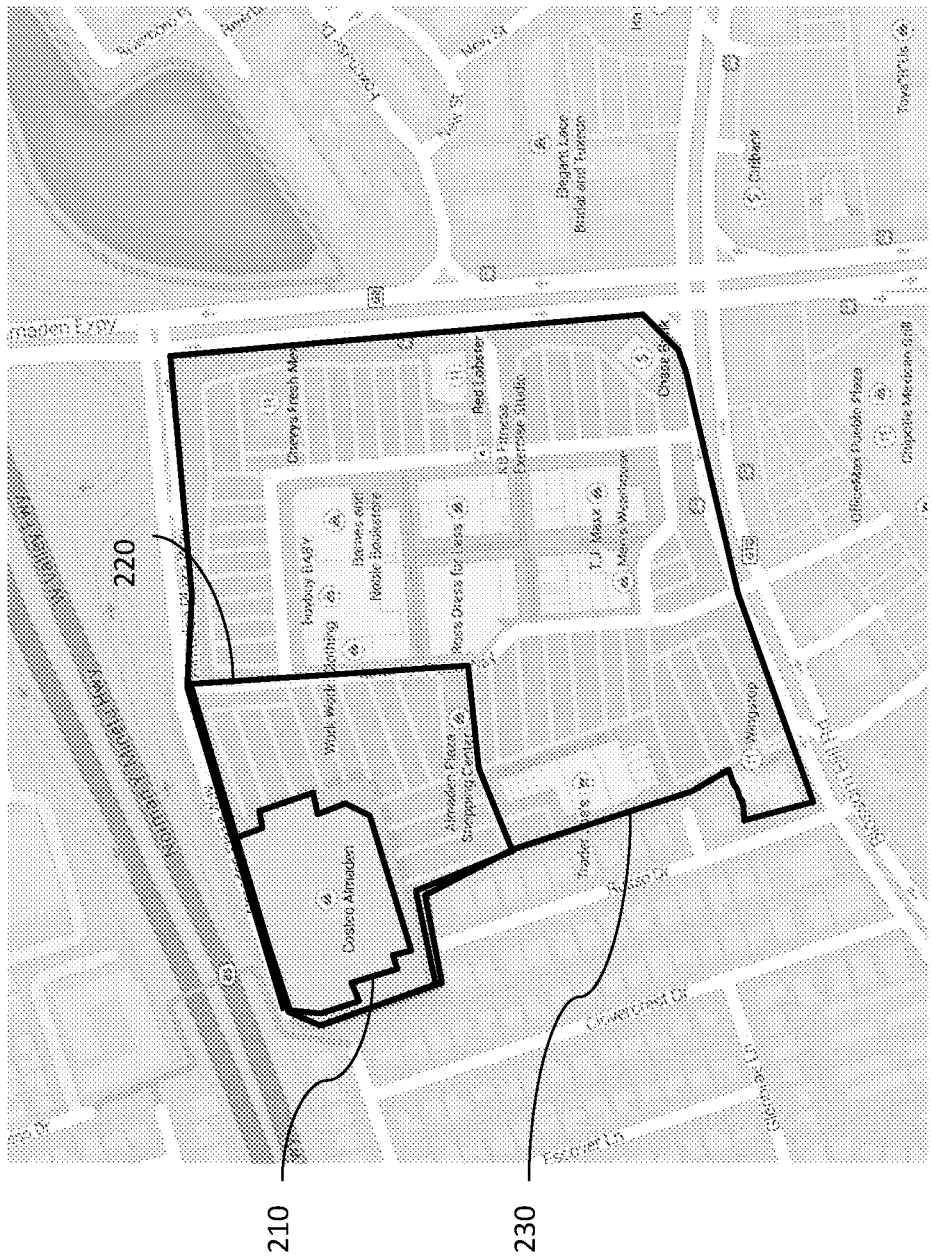
FIG. 2B is a diagrammatic representation of one or more polygon geo-fences defined in conformity with geographical configuration and surroundings of a store according to certain embodiments.

Therefore, instead of or in addition to geo-fences based on a radius around a centroid of a business location, the geo-fencing system 160 according to certain embodiments uses the map data 151 to define places that are of more interests to information sponsors. As shown in FIG. 2B, the geo-fencing system 160 defines one or more polygons in conformity with the geographical configuration and surroundings of the POI, such as a first polygon 210 around the building of the store, a second polygon 220 around the building and its parking lot, and/or a third polygon 430 around a shopping area or business region including the POI and other POIs. More details of such a geo-fencing system can be found in co-pending U.S. patent application Ser. No. 14/716,811, filed on May 19, 2015, which is incorporated herein by reference in its entirety.

In certain embodiments, different types of places may be defined for a POI so that information servers can provide information for delivering to mobile devices based on the type of places triggered by detected locations. For example, a request associated with a mobile device located inside the first polygon 210 around the building of the POI may be more valuable to an information sponsor and thus may be of higher value than a request associated with a mobile device that is in the shopping area (polygon 230) but not inside the store. Or, conversely, polygon 230 may be of higher value to another information sponsor who would like to attract mobile users in the business region than polygon 210, which indicates that the mobile user is already in the store. In certain embodiments, these three types of places are defined by extracting building polygons, parking lot polygons and land-use polygons from local and national geographical information systems (GIS). In certain embodiments, some or all of the places can be defined manually with assistance of computer annotation tools and by consulting some external map and/or satellite data to make sure that the geo-fences are aligned with the real building and region boundary information surrounding the intended businesses.

In certain embodiments, the different types of places associated with a business that are offered to the information sponsors include, for example, (1) a business center (BC) represented by, for example, a polygon corresponding to the perimeter of the building of the business (e.g., the first polygon 210 in FIG. 2B); (2) a business premise (BP) represented by a polygon corresponding to the perimeter of the business building and the neighboring parking lots (e.g., the second polygon 220 in FIG. 2B); and (3) a business region (BR) or area represented by a polygon corresponding to the perimeter of a shopping center or business or commercial area in which this business is located (e.g., the third polygon 230 in FIG. 2B). If a business center is triggered by a mobile device location, it can be reliably inferred that the user of the mobile device is interested in the business by actually visiting it. Triggering of a business premise provides good indication of an intent to visit the business, but not as strong as triggering the business center. If a user triggers a business region, the intent may be regarded as valid but weaker than that from triggering a business premise.

The geo-fencing system 160 further generates spatial indices representing the areas defined by the geo-fencing system 160, which are stored in the spatial index database 158 for searching by the search engine 156 with spatial queries, such as how far two points differ, or whether certain point falls within a spatial area of interest. FIG. 2C illustrates examples of spatial indices of geo-fences stored in the database 158, according to certain embodiments. As shown, the site Costco in Almaden has three different types of places associated with it—place US/CA/Almaden/BC is a business center (BC), which is a polygon around the store building and represented by spatial index a1, a2, . . . , ai; place US/CA/Almaden/BP is a polygon around the site's larger premise including its parking lot and represented by spatial index b1, b2, . . . , bj; and place US/CA/Almaden/BR is a polygon around the shopping center including the store and other POIs and represented by spatial index c1, c2, . . . , ck. FIG. 2C also shows that the site T.J. Maxx has three types of places associated with it, and the site Trader Joe's has at least a business center place associated with it. As shown in FIG. 2C, each geo-fence entry in the database 158 includes the spatial indices associated with the respective place together with other information about the respective place, such as, for example, a name/brand associated with the place, a category of the place, a place identifier identifying a particular locale (e.g., city, district, etc.) for the place, the place type, and/or one or more doc IDs identifying one or more information documents (e.g., one or more html/JavaScript files) for the name/brand or the place.

Figure 2D:
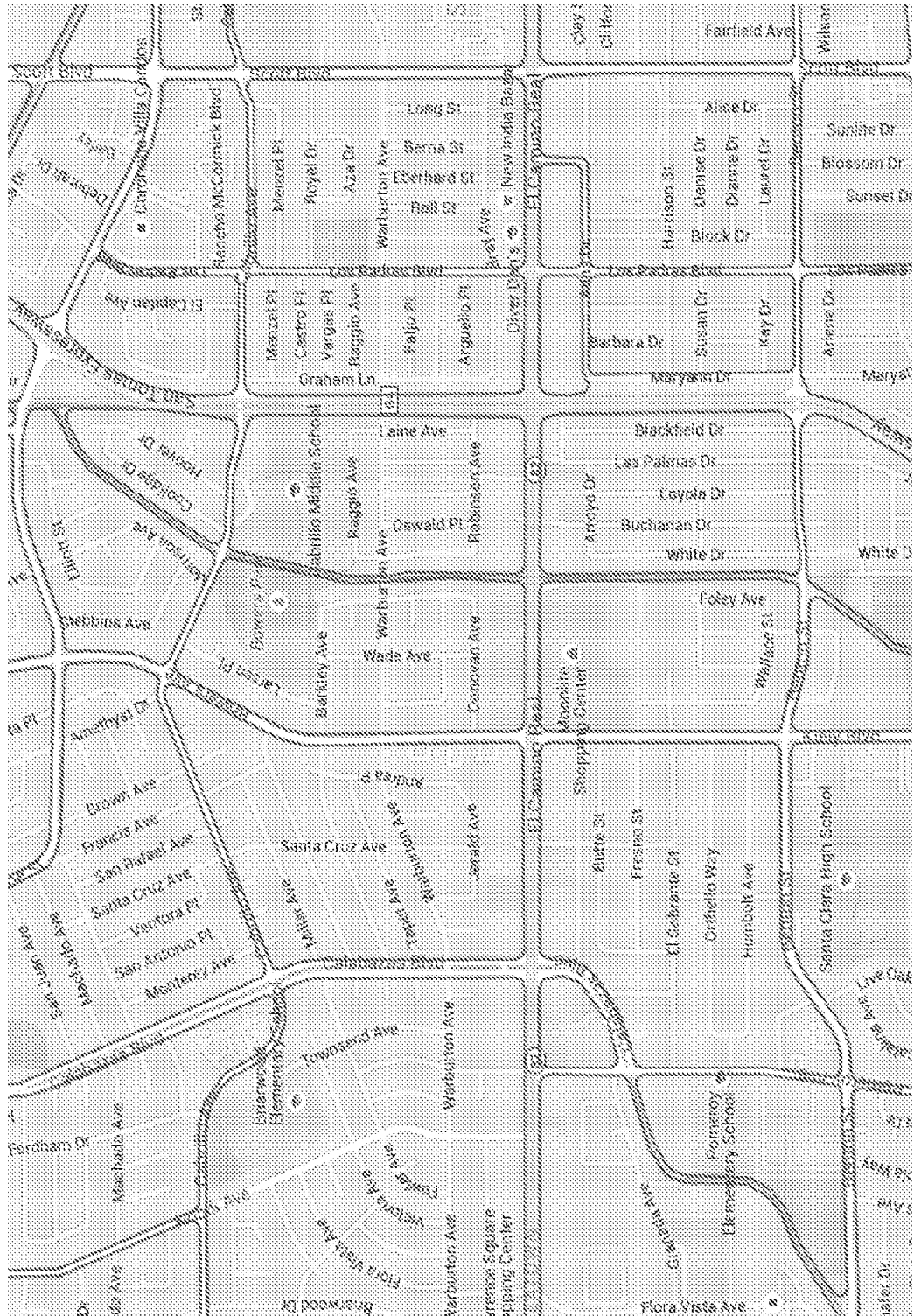
FIG. 2D is map image illustrating exemplary geo-blocks overlaid on a map of a geographical region created by the geo-block definition subsystem according to certain embodiments.

In certain embodiments, in addition to the places associated with POIs, the geo-fencing system 160 further generates geo-blocks representing geographical regions with natural boundaries such as major roads, shorelines, mountain ranges, etc., as described in co-pending U.S. patent application Ser. No. 15/344,482, filed Nov. 4, 2016, entitled "Systems and Methods for Performance-Driven Dynamic Geo-Fence Based Targeting," which is incorporated herein by reference in its entirety. FIG. 2D illustrates exemplary geo-blocks according to certain embodiments. In this example, for an area in the city of Santa Clara, Calif., the geo-blocks are shown as outlined in red boundaries overlaid on top of a map for the area, taken from, for example, Google Map, and the boundaries of the geo-blocks are mostly aligned with major roads, taking into account the road width so as to exclude mobile signals from travelers on the major roads. Each of the geo-blocks shown can be further partitioned into more granular blocks bordered by smaller roads. Real world entities present in these geo-blocks tend to serve common functional purposes (residential, retail etc.) and these blocks form the foundation for the construction of boundaries that are highly indicative of location dependent attributes such as intention and demographics.

To define the geo-blocks, the geo-fencing system 160 extracts geographical data of transportation route and natural boundary data from the map data 162, and creates geo-blocks using the extracted geographical data. It also derives meta data associated with each of the geo-blocks such as city/state, functionality, major POIs in the geo-block, demographic of residents in the geo-block, etc., from the map data, and other information such as amount of requests received from mobile devices in the geo-block within a certain time period (inventory), demographic of users of the mobile devices (for non-residential geo-blocks), etc., from the logged requests data and events data in the databases 168 and 166, and enriches the geo-blocks with relevant meta data.

Geometrically, transportation routes (highways, railways, waterways etc.), as well as natural boundaries (coastlines, lake boundaries etc.) are described as collections of line segments, together with meta data information such as their type, width and traffic speed. In certain embodiments, these line segments are collected and scored based on their significance, e.g., residential area roads in residential area score lower than highways do. Line segments scored above a threshold are collected to form a line set. The line set thus defined is then used to form polygons with boundaries aligned with the lines in the line set. The polygons thus formed, together with their associated meta data such as are initial geo-blocks. which are indexed and stored in the spatial index database 158, as shown in FIG. 2E.

In general, the definition of geographical regions is not limited to that described above. A different set of geographical regions with or without its own meta information can also be used for the subsequent processes.

In certain embodiment, the search engine 156 and some or all of the spatial index database 158, the geo-fencing system, and the POI database 151 can be part of the request processor 152.

In certain embodiments, as shown in FIGS. 3A-3C, the request processor 152 receives request 301 from the MSP server 140 via network 100. The request 301 includes mobile device location information including a plurality of location components, such as latitude and longitude coordinates (LL), IP addresses (IP), postal or zip codes (ZC), and/or city-state names (CS), etc, in addition to other information. In certain embodiments, the request processor 152 validates the location information by checking the validity and consistency of the location components and by weeding out any invalid location component(s). Generally, the LL is usually believed to be the most useful location component. However, when a mobile entity doesn't allow its location information to be known, mobile applications at the MSP server 140 typically provide only coarse location data in the form of, for example, an IP address, a ZC (e.g. entered by the user at the time of registration), or CS. Thus, mobile applications at the MSP server 140 frequently provide LLs obtained from geo-coding software, which translates ZC, CS, and other points of interests into one representative LL. In one embodiment, such representative LLs are categorized as "bad LLs". A bad LL can be, for example:
1. A centroid of a ZC/CS
2. Any fixed point on a map (e.g. (0,0) or an arbitrary location)

In certain embodiments, the request processor 152 is configured to weed out the bad LL's, so that location data with bad LL's are not provided to the next stage processing, by using the techniques disclosed in commonly owned U.S. patent application Ser. No. 14/716,816, entitled "System and Method for Estimating Mobile Device Locations," filed on May 19, 2015, which is incorporated herein by reference in its entirety.

The request processor 152 estimates the location of the mobile device from the request 301 and generates location data to represent an estimated mobile device location, which may be a geographical point represented by a lat/long pair or one or more probably areas or regions the mobile device is estimated to be in, as shown in FIG. 3B. The search engine 156 queries the spatial index database 158 with the lat/long pair to determine whether the location triggers one or more predefined places in the database 158, and returns the triggered place(s) to the request processor 152, which annotates the request 301 with the triggered place(s) to generate an annotated request 310, and stores the annotated request 510 in the request log 168. Additionally, the search engine 156 also queries the spatial index database 158 with the lat/long pair to determine whether the location is in one of the geo-blocks in the database 158, and returns the triggered geo-block to the request processor 152, which annotates the request 301 with the triggered geo-block. Thus, the annotated request 310 can also include the triggered geo-block, as shown in FIG. 3C.

In certain embodiments, as shown in FIG. 3A, the request 301 received from the Internet by the request processor includes other information as well as the location information, such as information about the mobile device and/or a mobile user associated with the mobile device, a time stamp indicating the time of the request (e.g., day, hour, minute, etc.), one or more keywords suggesting types of information for returning to the mobile device, and/or other information associated with the mobile user, the mobile device, and/or the MSP. In some cases, the location data can trigger multiple places. For example, as shown in FIG. 2B, a request that triggers the BC place 410 of Costco Almaden also triggers the BR place 430 of any of the POIs in the same business region. Thus, the request may be annotated with the BC place of Costco Almaden and the BR place of one or more other POIs in the same business region. As shown in FIG. 3C, each of the one or more places or geo-fences includes either or both of a place ID, a name and/or a category of the POI or its associated brand if any, and a place type (e.g., BC, BP, BR, or circle), some or all of which can be included in the annotated request 310 as location features 312 or 314.

In certain embodiments, a panel of mobile devices 130 are signed up to provide periodic location updates to the request processor 152 by installing and running a software development kit (SDK). Each location update is transmitted from a mobile device 130 to the packet-based network 100 in the form of one or more data packets that include the mobile device information, a time stamp and a lat/long pair indicating the mobile device location. The request processor 152 processes each location update similarly as it processes an information request and logs the location updates in a designated field in the requests database 168. FIG. 3D is a table illustrating examples of processed location updates.

Figure 4A:
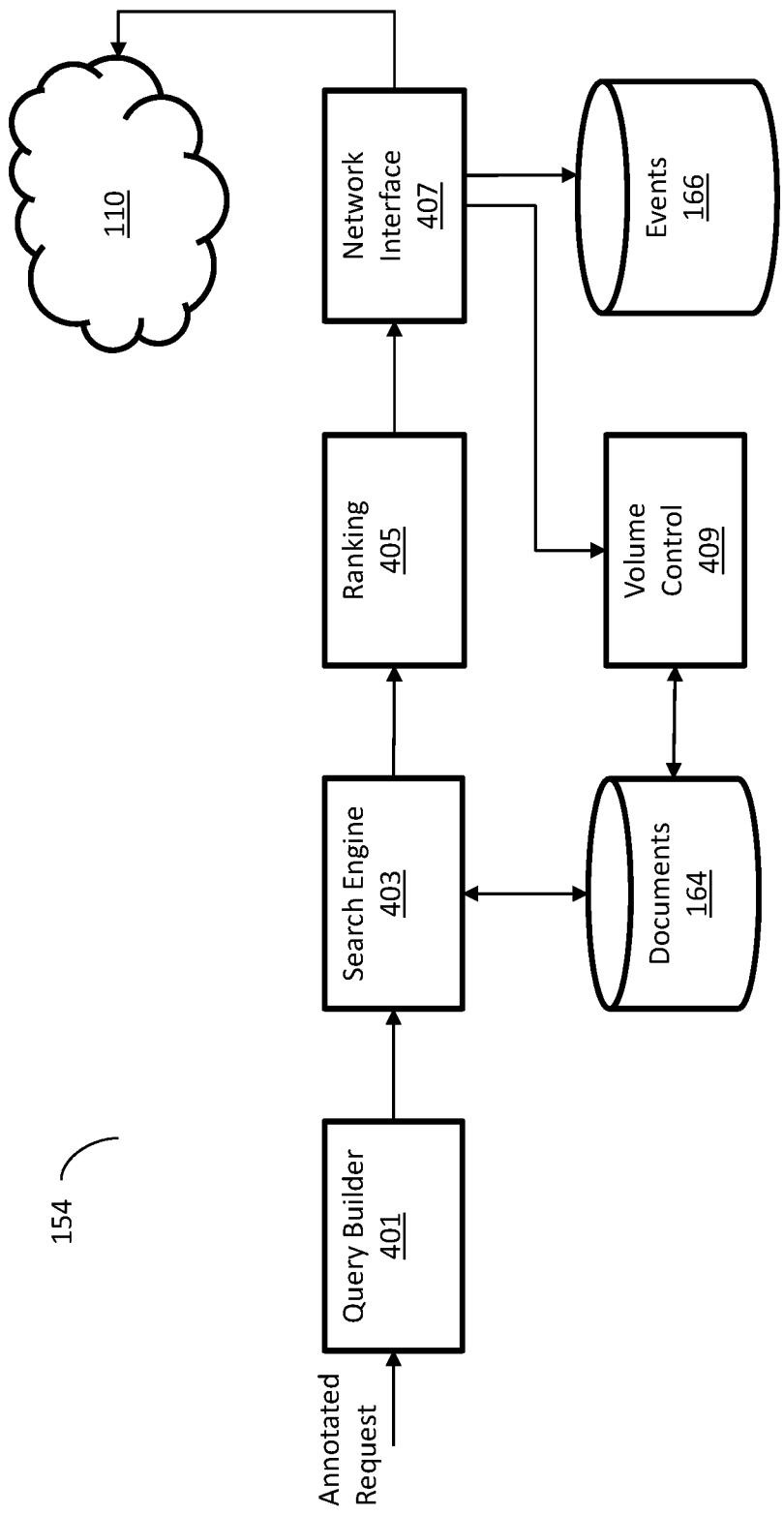
FIG. 4A is a block diagram of an information server according to certain embodiments.
Figure 4B:
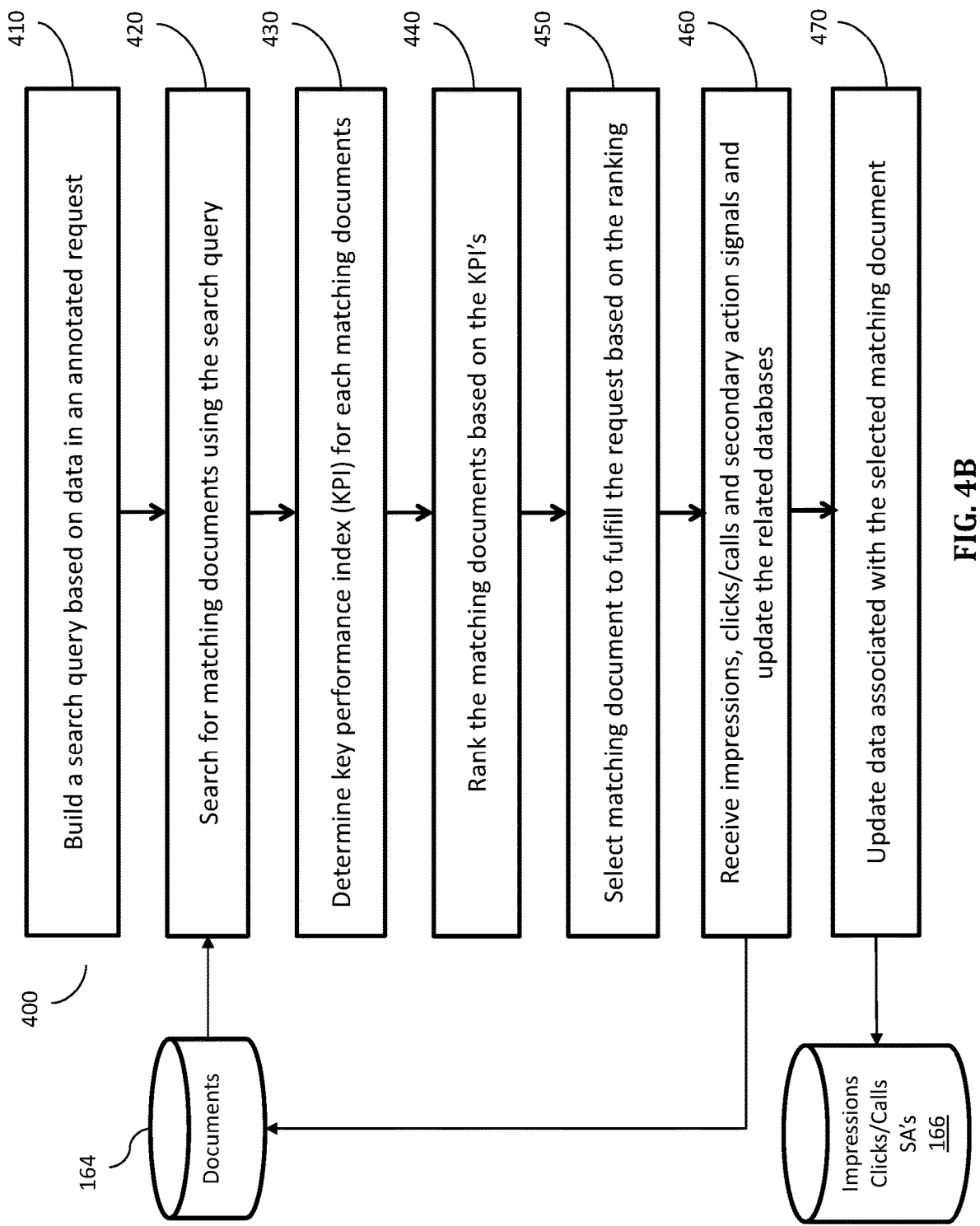
FIG. 4B is a flowchart illustrating a method performed by the information server according to certain embodiments.

In certain embodiments, the system 150 further includes an information server 154 that selects and transmits sponsored information to the MSP server (or Exchange) in response to each annotated request 310 output from the request processor 152. In certain embodiments, the information server 154 is a computer server, e.g., a web server, backed by a database server 164 that information sponsors use to periodically the content thereof—e.g., information documents, which when loaded on a mobile device displays information in the form of, for examples, banners (static images/animations) or text. FIG. 4B illustrates a process 400 carried out by the information server 154 according to certain embodiments. As shown in FIGS. 4A and 4B, the information server 154 includes a query builder 401 configured to build (410) a search query based on the data in the annotated request 310, a search engine 403 configured to search (420) the documents database 164 for one or more matching documents, and a ranking module 405 configured to determine (430) a key performance index (KPI) for each of the one or more matching documents, and to rank (440) the one or more matching documents based on the KPI's.

In certain embodiments, the one or more matching documents may include at least one first matching document having an associated KPI based on related on-line activities of mobile devices (e.g., clicks, calls, secondary actions, etc.) and at least one second matching document having an associated KPI based on related off-line activities of mobile devices (e.g., detected site visits, etc.). The KPI may also be dependent on the location data in the request, as mobile devices at certain locations may indicate higher likelihood of clicks/calls or secondary actions or site visits, and therefore higher projected performance, than mobile devices at other locations.

In certain embodiments, as shown in FIG. 4B, the ranking unit 405 is further configured to select (450) a matching document to fulfill the request based on the rankings, and the information server 154 further includes a network interface 407 configured to transmit information about the selected matching document to the requester via the packet-based network 110. The information can be provided in the form of, for example, an html/JavaScript file, or a link to a universal resource location (URL), which can be used by the MSP or a mobile device to fetch the html/JavaScript file. The html/JavaScript file, once displayed or impressed on a mobile device, also include one or more links that an interested user can click to access a webpage or place a call using the mobile device. The webpage enables the user of the mobile device to take secondary actions such as downloading an app or make an on-line purchase.

In certain embodiments, the html/JavaScript file is designed such that when it is displayed or impressed on a mobile device, a signal is sent by the MSP server or the mobile device automatically so that the information server 154 can keep track of whether the file has really been impressed on the mobile device. In certain embodiments, mechanism are also put in place such that when any of the one or more links are clicked, or when the mobile user download an app or make a purchase from a linked webpage, a signal is also sent from the mobile device to the information server 154 in the background so that the information server 154 can keep track of the clicks/calls or secondary actions made in response to the impression. The network interface 407 receives and records (460) such events (i.e., impressions, clicks/calls, and secondary actions) in the events database or log 166.

In certain embodiments, some or all of the documents in the documents database 164 may have limited budgets on the numbers of impressions/clicks/calls associated therewith. Thus, the ranking unit, before selecting a matching document to fulfill the request, may check to make sure that there is sufficient budget remaining for the matching document. Otherwise, the ranking unit may select the next ranked matching document. In certain embodiments, the information server 154 further includes a volume control unit 409 configured to adjust or update (470) the budget of a document in the documents database 154 in response to an impression/click/call event related to the document, or using a projection value of a possible site visit, as discussed further below.

Thus, logged data in the requests log 168 and the events log 166 collected over a period of time (e.g., six months) form a large collection of mobile device data (e.g., millions and millions of annotated requests and impression/click/call events). In certain embodiments, the system 150 further includes an evaluation module 170 having a set of specifically designed filters to query the big data in the requests log 168 and the events log 166 to obtain various data sets related to specific aspects of the performance of the delivered information documents. The evaluation module 180 further includes one or more electronic storages that stores the data sets for use by a set of computation engines designed to derive different types of performance measures or projections, which are used by the information server 154 to determine the KPI's of the matching documents.

Various methods have developed to fund mobile information campaigns geared at accommodating campaign budgets and campaign goals. Examples of such models include cost-per-mille (CPM), cost-per-install (CPI), and cost-per-click (CPC) models. These are just a few of the basic models for valuing mobile information delivery, which information providers can select to fund their information campaign on mobile devices.

CPM is the valuation model that is sometimes referred to as "pay-per-impressions." CPM in contemporary English simply means "cost per thousand." In a CPM campaign, an information provider pays the agreed bid rate for every 1,000 times a related document is displayed (i.e., impressed) on mobile devices. This model protects the mobile service providers, but does not provide any guarantee on results. Since CPM information providers pay for impressions and not for clicks and installs, they tend to use the delivered information mainly to raise awareness.

Moving one step closer to performance, information providers can also use the so called cost per click (CPC) model, (also known as PPC, i.e., pay per click), whether or not the clicks they pay result in actual conversions. With the CPC model, documents are chosen to be served to mobile device users based on a combination of the click-through rates (CTR) associated with the documents and the per-click bids that information providers make.

Cost per install (CPI), also known as cost-per-acquisition (CPA), charges information providers every time a delivered document results in a conversion, which can be, for example, people actually making a purchase, downloading an app, or performing another action recommended by the document. Thus, CPI campaigns help to give medium and small companies with limited marketing budgets a predictable return on their advertising investment. In addition, due to the growing fraud and viewability issues in online advertising, information providers commonly prefer pricing models such as CPI/CPA to get better value and protection for their money. The issues with this trend, however, is the increasing complexity of ad delivering systems in order to address issues such as conversion prediction, budget control, etc.

Furthermore, although the CPA model is appropriate for information campaigns with online conversion goals (such as in ecommerce), it is ineffective for tracking offline conversions. Therefore, some information sponsors may choose to pay for each physical site visit derived from an information campaign, so they do not need to be concerned about issues such as viewability, click fraud, etc. Also, in many industries, a site visit carries a known average purchase value. Thus, the value of each site visit can be clearly understood. Therefore, site visit based performance measure or projection allows the information providers to better understand their return of investment (ROI).

While a cost per visit (or CPV) model is desirable to many information providers, it requires novel techniques including: (a) an SVR (location visitation rate) estimation system, (b) a performance evaluation and budget control system bridging the CPM and CPV worlds, allowing a CPV model for some information sponsors even when the majority of the mobile service providers still charge on CPM; and (c) an adaptive attribution system capable of giving different location visitations different levels of credits.

Figure 5A:
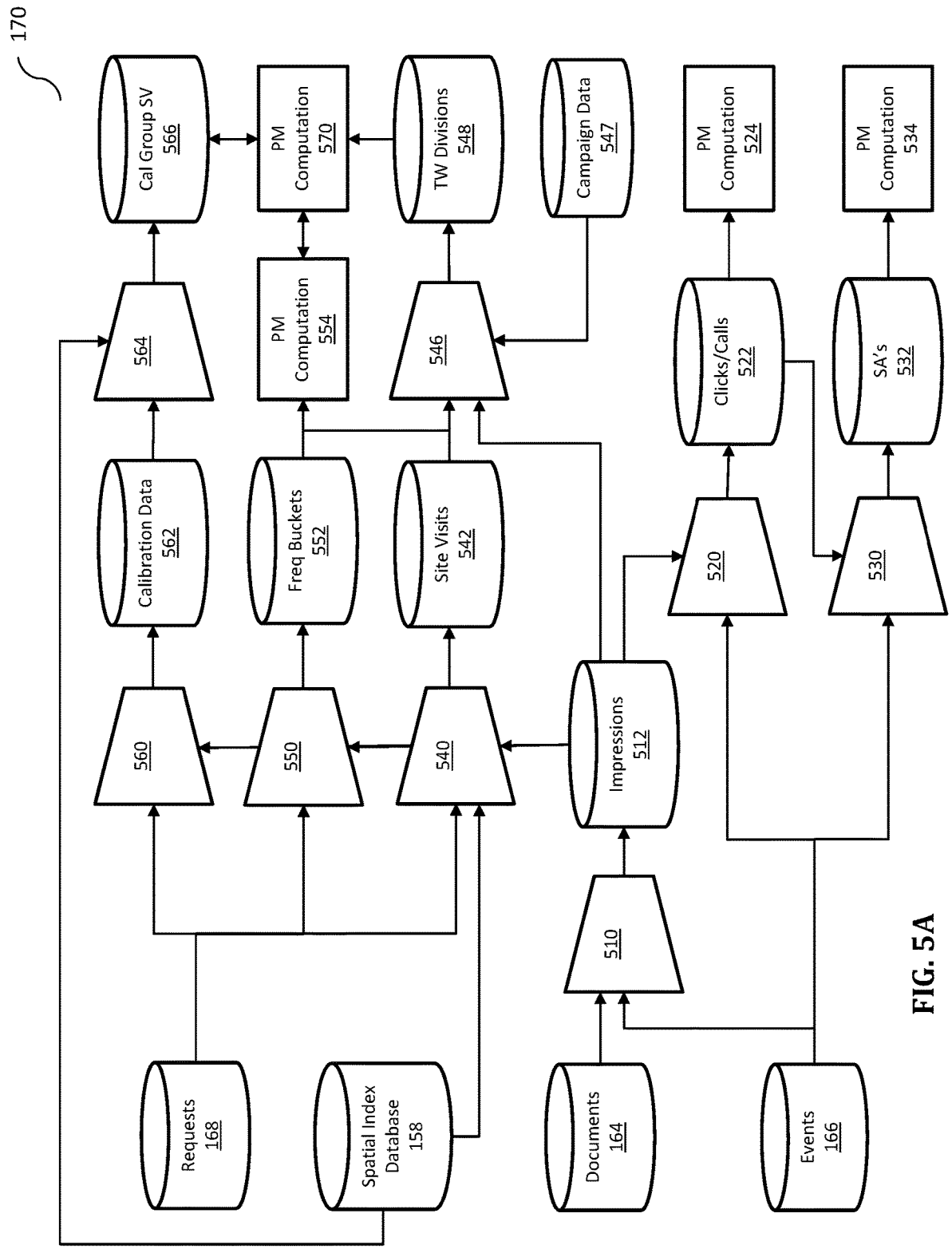
FIG. 5A is a block diagram of an evaluation module in the information system according to certain embodiments.

FIG. 5A is a block diagram of some of the components in the evaluation module 170 according to certain embodiments. As shown in FIG. 5A, the evaluation module 170 includes a filter 510 configured to obtain data related to each of a plurality of documents in the documents database 164, such as a document ID, a name/brand and/or category associated with the document, a type of performance measure (e.g., impression-based, click/call based, secondary action based, or site visit based, etc.) associated with the document, a price or cost for each impression, or click/call, or site visit, etc., to query the events database 166 for impression events related to the document, and to store data associated with the impression events in a data store 512. FIG. 5B illustrates examples of the impression events in the data store 512 grouped by each document and listed by the UID's of the mobile devices impressed with the document. As shown, each of the impressed mobile devices can have one or more impressions of the document with different time stamps (Day/Hour). The evaluation module 170 may further includes a computation engine (CB) 524 configured to count the number of mobile devices listed in the data store 512 and the number of mobile devices each having had at least one click/call event, and to compute a performance measure ($PM|_{CC}$) that is based on click/call events (CC) as follows:

$$PM|_{CC}=CPC*CTRest*1000,$$

where CPC is the cost per click/call, CTRest is an estimated click through rate, which can be the ratio of the number of mobile devices each having been impressed with the document and having had at least one click/call event over the number of mobile devices listed in the data store 512. The multiplier of 1000 is to map the performance measure to the CPM valuation model.

As shown in FIG. 5A, the evaluation module 170 may further includes a filter 520 configured to obtain data related to each of the impressed mobile devices in the data store 510, to query the events database 166 for click/call events related to the document, and to store data associated with the click/call events in a data store 522. FIG. 5B illustrates examples of the click/call events in the data store 522 grouped by each document and listed by the UID's of the mobile devices impressed with the document. As shown each of the impressed mobile devices can have none or one or more click/call events related to the document with different time stamps (Day/Hour).

As shown in FIG. 5A, the evaluation module 170 may further includes a filter 530 configured to obtain data related to each of the impressed mobile devices having had at least one click/call event according to the data in the data store 522, to query the events database 166 for secondary action events related to the document, and to store data associated with the secondary action events in a data store 532. FIG. 5B illustrates examples of the secondary action events in the data store 532 grouped by each document and listed by the UID's of the mobile devices impressed with the document. As shown each of the mobile devices having had at least one click/call event can have none or one or more secondary action events related to the document with different time stamps (Day/Hour). The evaluation module 170 may further includes a computation engine (CB) 534 configured to count the number of mobile devices listed in the data store 512 and the number of mobile devices each having had at least one secondary action event, and compute a performance measure ($PM|_{SA}$) that is based on secondary action events (SA) as follows:

$$PM|_{SA}=CPI*SARest*1000,$$

where CPI is the cost per install (e.g., download, purchase, etc.), SARest is an estimated secondary action rate, which can be the ratio of the number of mobile devices each having been impressed with the document and having had at least one secondary action event over the number of mobile devices listed in the data store 512. Again, the multiplier of 1000 is used to map the performance measure to the CPM valuation model used for some of the other documents.

In certain embodiments, location visits are tracked using request data packets associated with the group of users. The location module generates annotated requests from the request data packets, as described above. As shown in FIG. 5A, the evaluation module 170 further includes a filter 540 configured to obtain data related to each of the impressed mobile devices in the data store 512, to query the request database 168 for site visit events related to the document, and to store data associated with the site visit events in a data store 542. FIG. 5B illustrates examples of the site visit events in the data store 542 grouped by each document and listed by the UID's of the mobile devices impressed with the document. As shown each of the mobile devices having had at least one impression event can have none or one or more site visit events related to the document with different time stamps (Day/Hour). The site visits are detected from the annotated requests, which are annotated with places having the same number/brand and/or category as the document.

Unlike the processes of obtaining the CC-based and SA-based PM values, where the clicks/calls and secondary actions can be tracked electronically as originating from the delivered information, this is not so with site visits because a detected site visit may or may not be the result of an impression event, especially when the visit happens before or long after the impression event. Therefore, the evaluation module 170 further includes a filter 546 configured to obtain information campaign data related to the document from a campaign database 547, to filter the data in the data store 542 to obtain site visit data in different time windows, and to store the filtered site visits data in a data store 548.

Figure 6A:
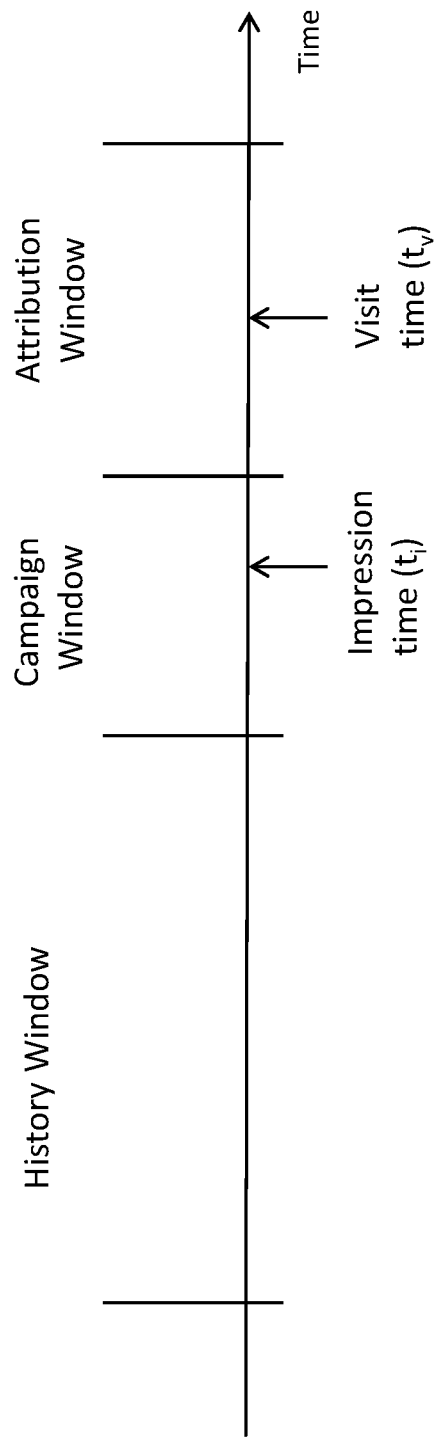
FIG. 6A is a table illustrating location historical data of a few mobile users according to certain embodiments.

Referring to FIG. 6A, the time windows include at least three time windows: a history window, a campaign window and an attribution window. The campaign window represents the timeframe when the campaign to deliver the document runs. The attribution window represents a limit on the time lag between the time of impression and the location visits where the location visits can still be attributed to the campaign. Note for impressions made at different times, the attribution windows can be sliding windows respectively defined for each impression time period, as discussed below and in co-pending U.S. patent application Ser. No. 15/289,104, filed Oct. 7, 2016, entitled "Method and Apparatus for Measuring Effect of Information Delivered to Mobile Devices," which is incorporated herein by reference in its entirety, For example, as shown in FIG. 6B, an information campaign with a document identified with DocID D2765 runs from Feb. 21, 2017 to Feb. 28, 2017. A user with UID 56***845 was impressed on Feb. 24, 2017 with the ad, in response to a request identified by the request ID 0125785237. Another request associated with the user (request ID 0136819975) was later received on Mar. 1, 2017, which has location data indicating that the user was at the location identified as B123. Since the location B123 is associated with the campaign and the later received request is received during the attribution window, the later received request indicates a visit to the location and is recorded by the attribution module as a visit associated with the campaign.

In certain embodiments, a performance measure based on site visits (SA) can be determines as follows:

$$PM|_{SV}=CPV*SVRest*1000,$$

or $$PM|_{SV}=CPV*SVRest*(freqv/freqi)*1000,$$

where CPV is the cost per visit, SVRest is an estimated site visit rate, freqv is the average visits per visitor within an attribution window of time after impressions are made for a campaign, and freqi is the average impression frequency. Typically (freqv/freqi) is considered as a per campaign level constant, and CPM is primarily determined by estimated SVRest. The multiplier 1000 is used to map the performance measure to the CPM valuation model used for some of the other documents. When equal weights are given to each site visit, SVRest can be estimated by selecting a first number of unique mobile devices each having had at least one impression event with the document in the campaign window, discovering a second number of unique mobile devices among the first number of unique mobile devices, each of the second number of unique mobile devices having had at least one site visit event in the attribution window, and computing the SVRest as the ratio of the second number to the first number. In certain embodiments, if there are multiple exposures each followed by a visit, only one visit is considered in the above SVR estimation. In certain embodiments, if there are multiple visits following an exposure, only one visit is considered in the above SVR estimation.

In certain embodiment, SVR is used as an estimate of the likelihood that a user impressed with a document will visit one or more targeted locations during an observation window of time. Typically, the one or more locations are related to one or more brands associated with the information campaign. For example, for a McDonalds campaign, an SVR metric can be defined as the percentage of the impressed users who visited McDonalds restaurants within a predetermined attribution window. Note the targeted locations are defined by the scope of the information campaign, it could be nation-wide McDonalds restaurants, or just California McDonalds restaurants.

Figure 6C:
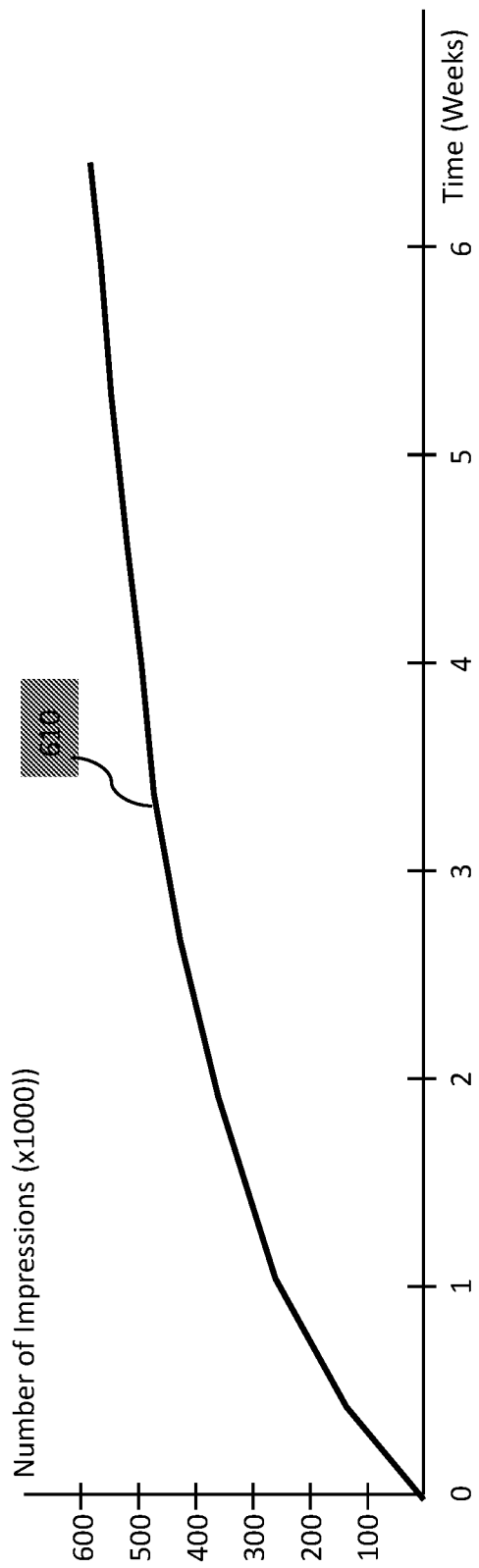
Figure 9A:
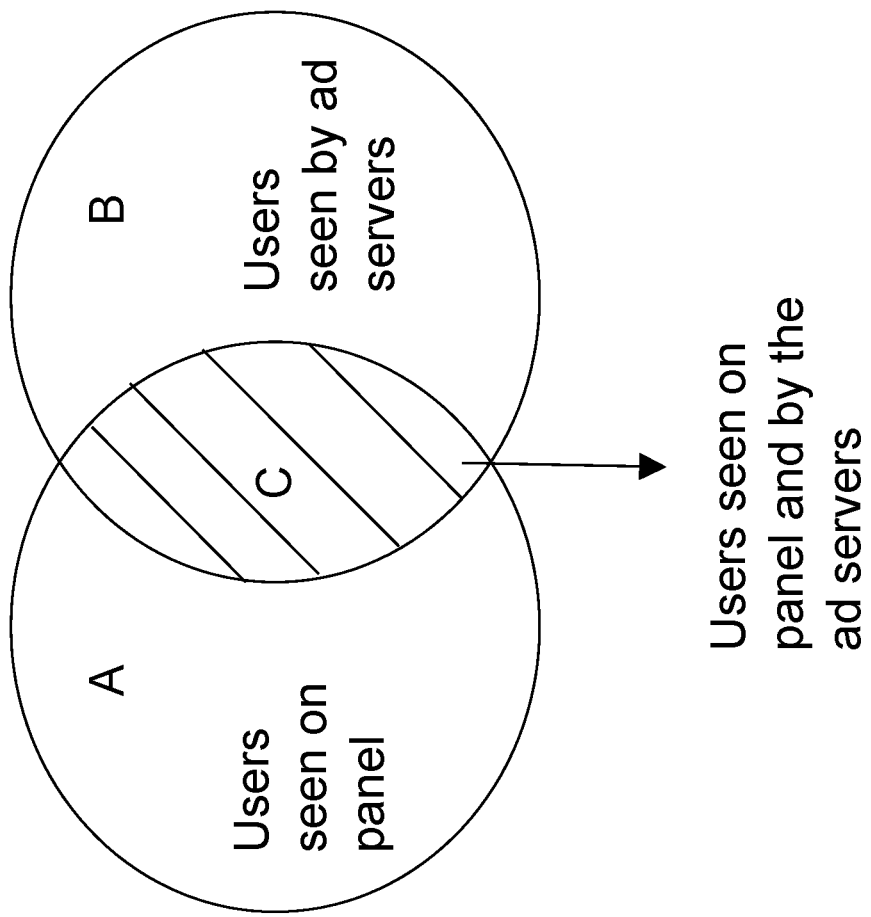
FIG. 9A is a diagram illustrating overlapping of qualified mobile devices (users) on a panel and qualified mobile devices (users) seen by the information system according to certain embodiments.

In certain embodiments, an information campaign flight (i.e., duration of an information campaign) is divided to include multiple windows, and location visit rate can be calculated for each window at first and then averaged over the multiple windows to arrive at the final SVR. For example, an information campaign flight may last several weeks, with an increasing number of mobile users becoming exposed to the information campaign as the number of impressions increase over the course of time, as illustrated by the curve 610 in FIG. 6C. Note that a mobile user can be exposed to the information campaign multiple times during the campaign flight, so the number of impressions in FIG. 9A do not necessarily equal to the number of exposed mobile users.

Figure 6D:
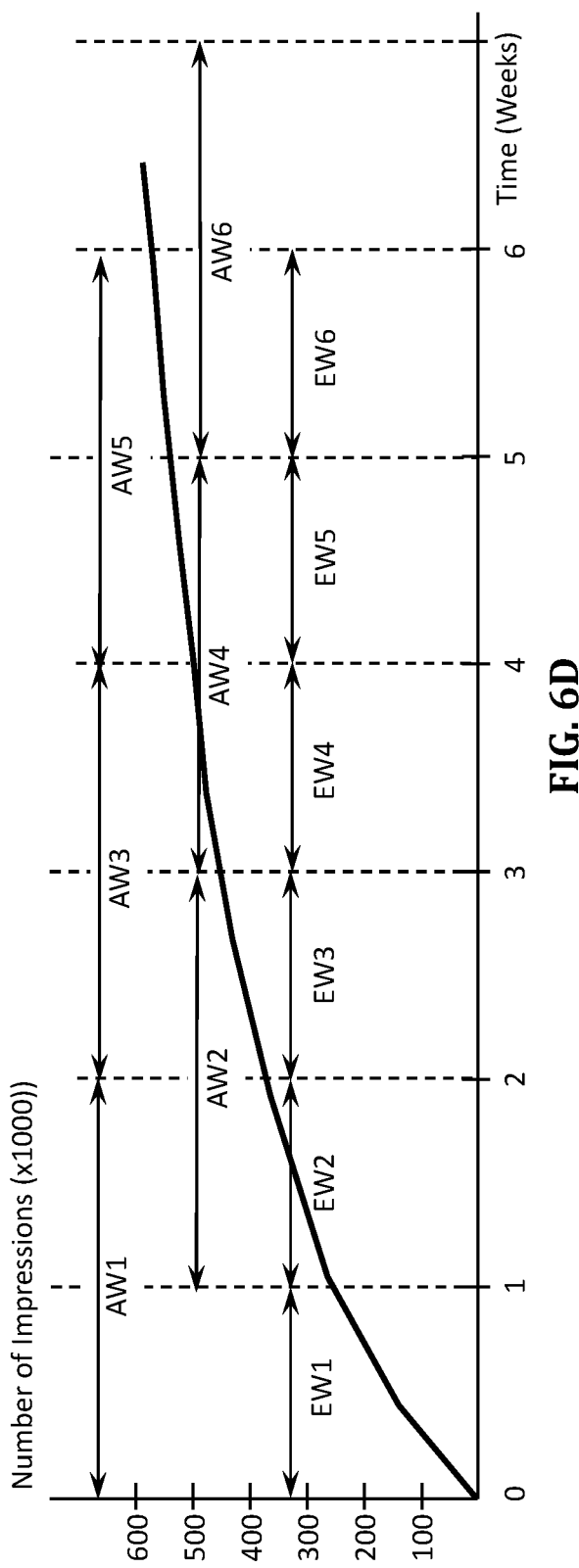

As shown in FIG. 6D, the flight of the information campaign is divided to include multiple exposure windows, e.g., EW1, EW2, . . . , and EW6, each is associated with a visit attribution window, e.g., AW1, AW2, . . . , and AW6, respectively. For each exposure window, a group of impressed users are determined based on information requests and document delivery during the exposure window, and an SVR is computed based on location visits during the associated visit attribution window. An overall SVR is computed by averaging over the multiple exposure windows.

Figure 6E:
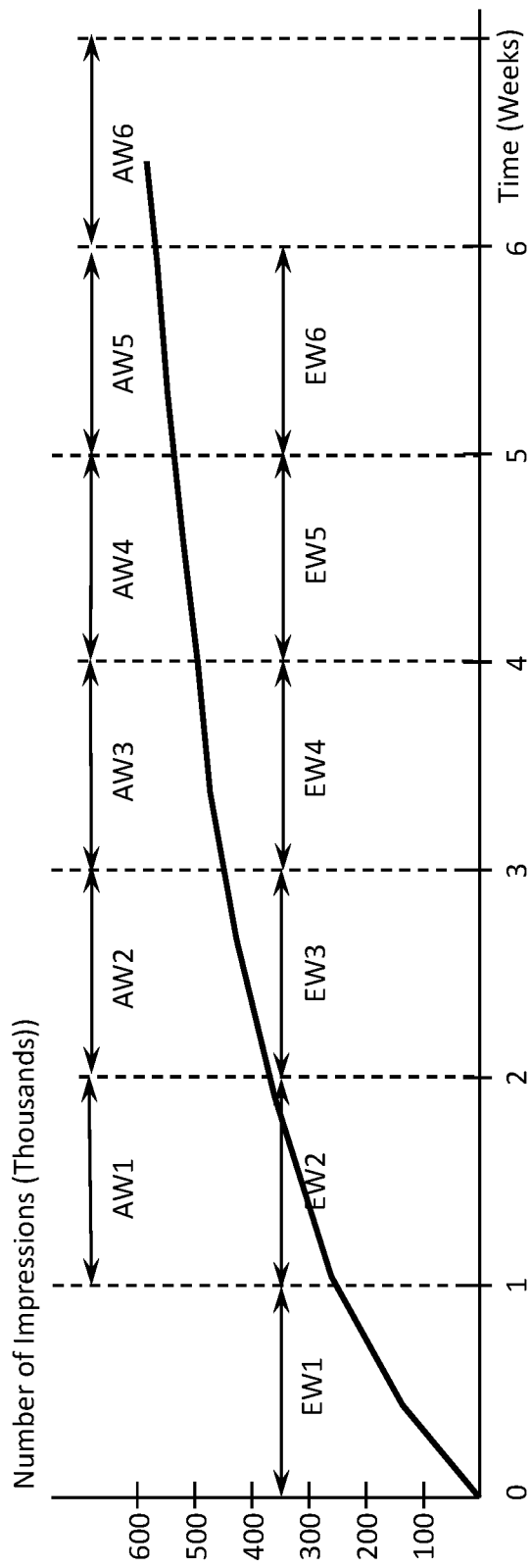

In FIG. 6D, each attribution window (e.g., AW1) is shown to overlap with and extend beyond its associated exposure window (e.g., EW1). In this case, location visits occurring during an exposure window (e.g., EW1) as well as afterwards are considered in the calculation of the location visit rate for the exposure window (e.g., $SVL_1$), even though the group of exposed users are determined at the end of the exposure window. In other embodiments, as shown in FIG. 6E, each attribution window (e.g., AW1) does not overlap with its associated exposure window (e.g., EW1). Thus, location visits occurring during an exposure window (e.g., EW1) are not considered in the calculation of the location visit rate for that exposure window (e.g., $SVL_1$).

In certain embodiments, the effect of an information exposure is made to decay over time. Thus, as the lag between information exposure and location visitation increases, the effect of the information exposure contributing to that visit decreases. To avoid over statement in the location visit rate calculation, effect on the SVR calculation from an exposed user can be made to fade as the information campaign proceeds unless that user is exposed to the information campaign again. In certain embodiments, a decay function is defined which determines the contribution of a user to the SVR calculation based on how long ago the user has been exposure to an information campaign.

In certain embodiments, the history window is used to identify users who had already visited the targeted locations before the starting of an information campaign. These users can be excluded from accounting so information providers only pay for visits most likely to have been initiated by the campaign, i.e., visits by people who did not visit the targeted locations in the history window, or the people who visited the targeted locations with very low frequency. In other embodiments, different weight can be given for new visits by new visitors and repeated visits by repeating visitors. Different weight can also be applied to different situation.

For example, some retailers may be willing to pay higher rate for Tuesday visits than weekend visits.

Furthermore, different weights can be given to visits to different sites, or to different types of places at the same site. For example, some retailers may be willing to pay higher rate for a visit to a business center (BC) place than a visit to a business premise (BP) place, or vice versa. Thus, in general, the SVRest can be estimated as follows:

$$SVRest = \frac{(Weighted\_Sum\_Unique\_MDs\_with\_SV\_in\_a\_Group)}{(Number\_of\_Unique\_MDs\_in\_the\_Group)}$$

where MD stands for "Mobile Device" (thus, "MDs" stands for "Mobile Devices"), each unique MD counts as 1 in the weighted sum, and the weight for the MD in the weighted sum can be the weight associated with the highest weighted SV event for the unique MD. For example, if the MD had one SV event at a BP place associated with the document and another SV event at a BC place associated with the document, and the BC place is weighted higher than the BP place, the weight of the BC place is used as the weight for the MD in the weighted sum. The group of unique MDs can be the MDs impressed with the document during a campaign window.

Note location visits determined via information requests is not usually an actual representation of the effect of an information campaign. In a typical mobile network setup, a user's location (e.g., latitude and longitude, or LL) is shared with the information servers only when an information request associated with the mobile user is sent to the information servers. If a user's mobile device is not running apps that send information requests to the information servers at the time of the user's location visitation, this visit is not visible to the request processor 152 and thus is not counted by the evaluation module 170. Note that the unweighted SVR is calculated using the formula:

$$SVR = \frac{(Number\_of\_Unique\_Users\_Who\_Visited\_the\_Targeted\_Store)}{(Number\_of\_Unique\_Users\_in\_the\_Group)}$$

This calculation alone is not usually an actual representation of the effect of an ad campaign because, while the denominator is easily obtained by counting the number of users in a user group, the numerator does not usually represent the actual number of users in the user group who have visited a store because most of these users do not make their locations accessible all of the time. In a typical mobile ad network setup, a user's location (e.g., latitude and longitude, or LL) is shared with the ad servers only when an ad request associated with the mobile user is sent to the ad servers. If a user's mobile device is not running apps that send ad requests to the ad servers at the time of the user's store visitation, this visit is not visible to the request server 130 and thus is not counted in the denominator of the SVR calculation.

Figure 7:
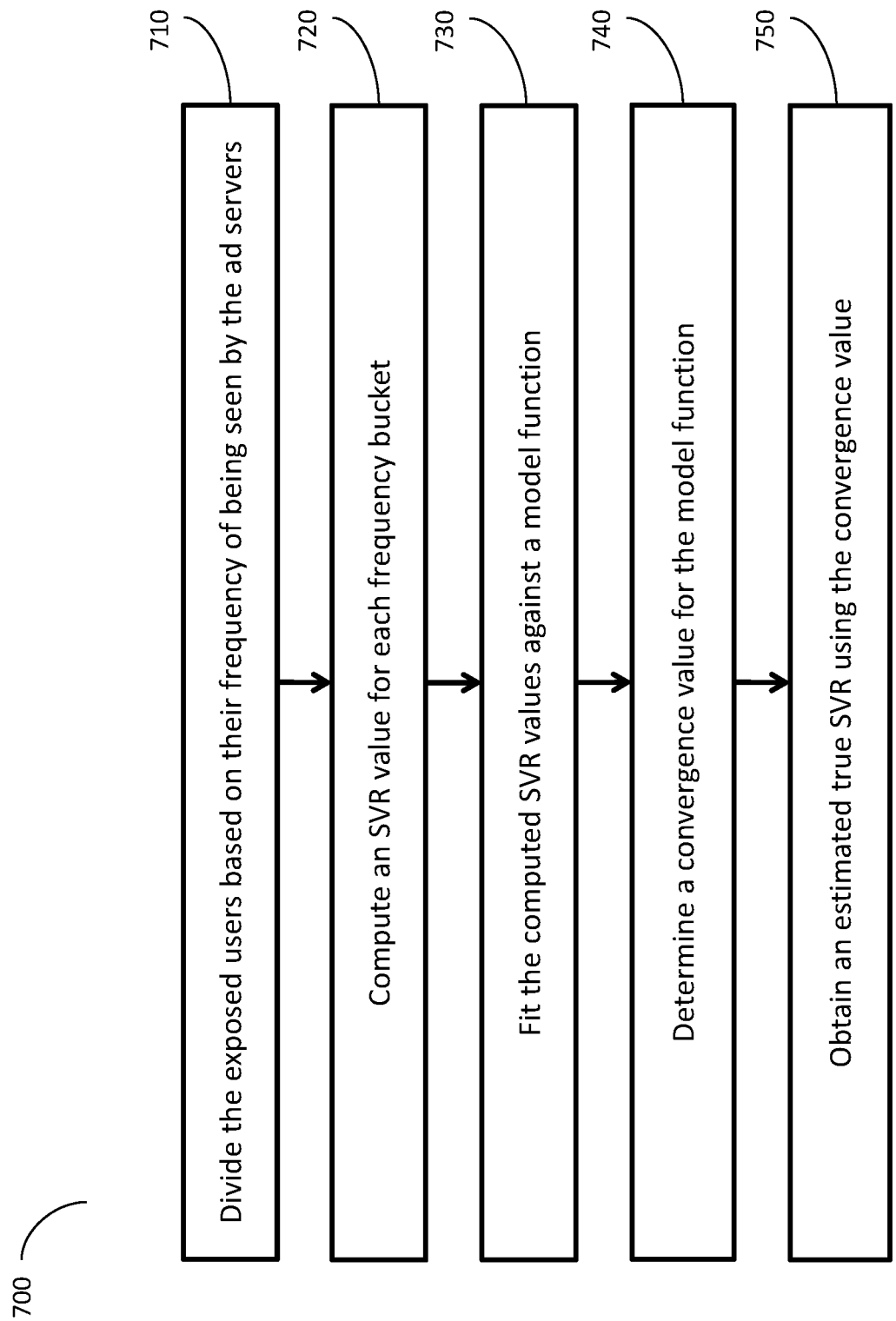
FIG. 7 is a flowchart illustrating a frequency modeling method to project an actual targeted response rate of mobile users exposed to an information campaign according to certain embodiments.

In certain embodiments, a frequency modeling method is used to project a more accurate count of mobile users who visited a targeted location after information exposure. FIG. 7 is a flowchart of a frequency modeling method 700 according to certain embodiments. As shown in FIGS. 5A and 7, the evaluation module may further include one or more frequency filters 550, which can be applied to the data in the data store 510 to divide the mobile users exposed to the document (710) into multiple frequency buckets each associated with a range of frequencies with which mobile user are seen by the system 150. Data associated with the different frequency buckets are stored in a data store 552 and used by the computation engine 554 to compute (720) an SVR value for each of the frequency buckets. In certain embodiments, the frequency may be measured as the number of days requests related to a mobile user show up at the system 150 during a predetermined time window (30 days). Thus, the mobile users who showed up only in one of the 30 days are less likely to be captured during their visits to a targeted location than mobile users who showed up in 10 of the 30 days. Thus, the SVR calculated from the mobile users in the lower frequency bucket would be lower than the SVR calculated from the mobile users in the higher frequency bucket, as shown in FIG. 8.

Figure 8:
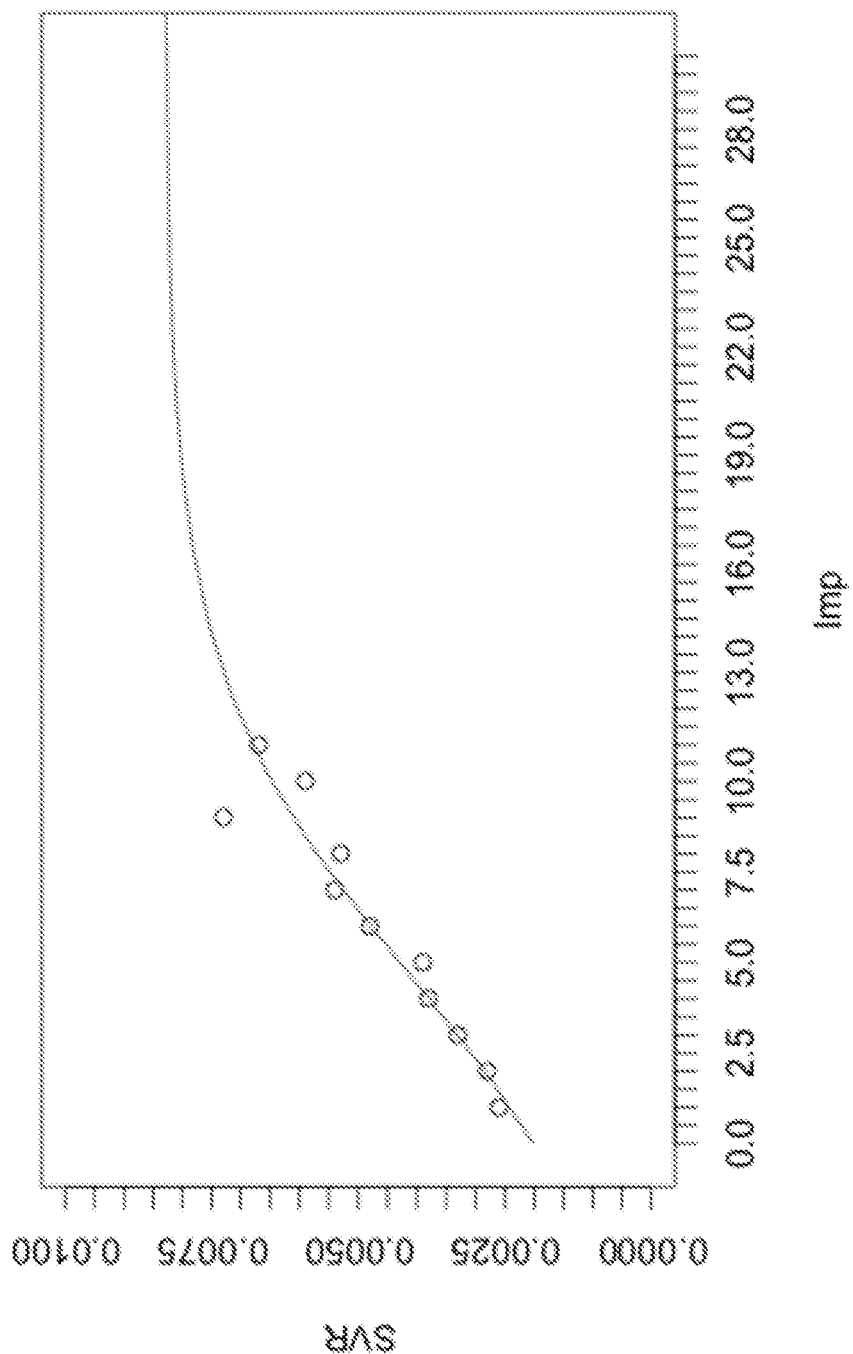
FIG. 8 is a plot illustrating targeted response rate data points calculated for respective frequency buckets being fitted to a model function.

Referring to FIGS. 7 and 8, the computation engine is further designed to fit (730) the computed SVR values against a model function. For example, the SVR data points in FIG. 8 can be fitted to the following exponential model function:

$$y=a/(1+\exp(-b*x+1)).$$

By fitting this function to the data points in FIG. 8, with x corresponding to the bucket frequencies (Imp) and y corresponding to the SVR values for the respective buckets, the parameters a and b can be determined. The computation engine then determines (740) a convergence value for the model function when x approaches infinity, which in this case is equal to a. The actual SVR for the entire group of mobile users can be estimated (750) to be this convergence value, which correspond to the projected situation when the document delivery system can see the mobile users all the times during the predetermined time window. In other words, the plot shown in FIG. 8 is extrapolated to find the SVR of a projected group of users who are seen an infinite number times on a information serving network.

In certain embodiments, a panel-assisted method is used to estimate the actual SVR. Using this method, an initial panel of qualified mobile users is used to derive a multiplier value that is used in later SVR calculations by the system 150. In certain embodiments, the panelists on the initial panel of users are qualified mobile users who have agreed to share their mobile device locations with the system 150 at a very high frequency (e.g., one data packet in every 20 minutes or 10 minutes or shorter) by installing and running a designated app (SDK) in the background on their mobile devices. The designated app on a mobile device is designed to provide the location (e.g., LL) of the mobile device at a predetermined frequency (e.g., every 10 minutes) in the form of, for example, data packets that also include identification of the respective mobile devices and other relevant information. Because of the high frequency of location sharing, most of the location visits by the panelists would be visible to the system 150, with one or more request servers 130 receiving two types of incoming data packets, i.e., information requests from, for example, mobile service providers and/or exchanges, etc., and data packets from panel mobile devices running the designated app.

FIG. 9 illustrates three groups of mobile users, Group A being the qualified mobile users on the panel, Group B being qualified mobile users who have been "seen" by the system 150 because of associated information requests, and Group C being mobile users who are in both group A and group B. Thus, Group C are mobile users who have been using apps that cause information requests to be sent to the system 150 and who also belong to the panel with the designated app running in the background of their mobile devices. Group C will be used in the panel-assisted method to determine the multiplier value for actual SVR estimation.

Figure 9B:
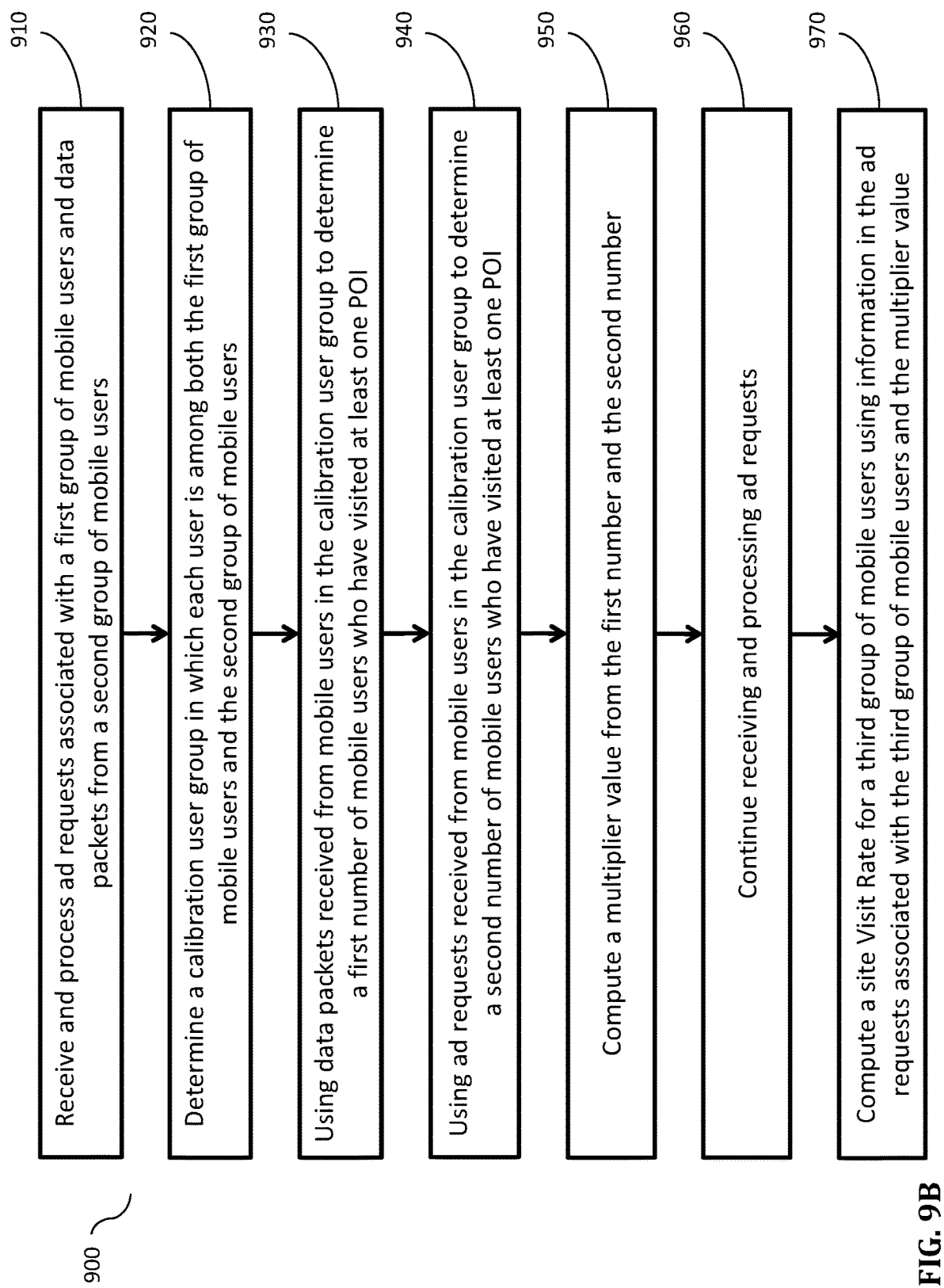
FIG. 9B is a flowchart illustrating a panel-assisted method of estimating an actual targeted response rate according to certain embodiments.

FIG. 9B illustrates a panel-assisted method 900 for estimating actual SVR according to certain embodiments. As shown in FIG. 9, using the method 900, the request processor 152 receives and processes information requests from a first group of mobile users (e.g., Group A), and further receives and processes (910) panel data packets from a second group of mobile users (e.g., Group B). The processed information requests and panel data packets are stored in the requests database 168, as discussed above. In certain embodiments, the evaluation module 170 may further include a calibration filter 560 that query the impression data in the data store 512 to look for a set of calibration mobile devices belong to a calibration user group (Group C) and then filter the data in the requests database 168 to obtain (920) request data and panel data associated with the calibration user group in which each user is among both the first group of mobile users and the second group of mobile users. The request data and panel data associated with the calibration user group are stored in the data store 562. The evaluation module 170 may further include site visit filter 562 that query the panel data in the data store 562 to determine (930) a first number of mobile users who have visited at least one of a set of calibration POI's selected for calibration purposes. The site visit filter 562 is then applied to the requests data in the data store 562 to determine (940) a second number of mobile users who have visited the at least one of the set of calibration POI's. Now the first number should be more representative of the actual number of mobile users in the calibration group who have visited the at least one of the set of calibration POI's because their locations are much more frequently shared with the system 150. The second number is the number of mobile users seen by the system 150 without the designated app. Thus the second number of mobile users are more representative of mobile users that can be tracked without the designated app. The first number and the second number associated with each of the set of calibration POI'S are stored in the data store 566.

In certain embodiments, the evaluation module 170 further includes a computation engine 570 configured to use the first number and the second number to compute (950) a calibration factor as an approximate representation, for any group of exposed mobile users, the ratio of the actual number of location visits to the count of location visits that can be detected by the system 150 using only information requests. In certain embodiments, this calibration factor (SVR_multiplier) can simply be the ratio of the first number over the second number. This SVR_multiplier is stored in the data store 566 and is used by the computation engine 570 in later SV based performance measure calculations.

In certain embodiments, any device id (in the form of IDFA, GIDFA) seen from regular information requests and panel data packets over a time window of, for example, 90 days, are stored in the requests log 168 as key-value locations. The key-value locations for information requests and panel data packets serve as the user location for regular users and panel users respectively. The users who are in both panel user location and regular user location are referred to above as forming the calibration user group. In certain embodiments, a time window (e.g., 1 week) is used as a calibration window, in which the first number of users and the second number of users are counted based on data packets from the designated app and regular information requests received by system 150, respectively.

Thus, as the information delivery system 150 continues to receive and process (960) information requests, the computation engine 570 computes (970) a predicted SVR for future exposed mobile users as follows:

SVR=SVR_observed*SVR_multiplier where SVR_observed is observed SVR based on regular information request signals captured on the information servers, as defined in the above, i.e., $$SVRest = \frac{\text{(Weighted\_Sum\_Unique\_MDs\_with\_SV\_in\_a\_Group)}}{\text{(Number\_of\_Unique\_MDs\_in\_the\_Group)}}$$

The SVR multiplier can be determined at different levels such as region-wise, verticals, brands, and campaigns, as discussed below. In certain embodiments, a different SVR_multiplier is estimated for different business vertical (i.e., a set of related brands). For that purpose, the calibration POI set (i.e., one or more target locations used to measure the SVR) is selected such that only the POIs belonging to one particular vertical or brand (e.g., McDonalds') is selected to determine that SVR multiplier for that particular vertical or brand.

To determine a region-wise multiplier, the calibration POI set is selected to include all major brands in a geographical region, which can be a country (e.g., United States), a state (e.g., California), a city (e.g., New York), or other municipalities or regions. With such large amount of data, the region-wise (e.g., country-level) multiplier can remain stable across an extended period of time. The region-wise multiplier, however, does not account for specific aspects of information campaigns that may directly influence the SVR, such as target audience and brand.

To determine a vertical-level multiplier, the calibration POI set is selected to include only POIs belonging to a vertical, e.g., a set (e.g., a category) of brands nationwide. The vertical-level multiplier improves upon the country-level multiplier by accounting for potential differences in location visitation among visitors at different types of locations, i.e. restaurants vs retailers. However, the brands within a vertical may exhibit different SVR patterns from each other.

To determine a brand-level multiplier, the calibration POI set is selected to include only POIs associated with one specific brand. As information campaigns are typically associated with brands, the brand-level multiplier allows for a direct multiplication. However, issues of sparse data begin to appear at this level, especially for international brands. Moreover, the brand-level multiplier is more subject to fluctuation than either the vertical-level or country-level multipliers, given the defined window of information exposure.

A campaign-level multiplier is equivalent to a brand-level multiplier, except that calculations are restricted to targeted user group defined by a specific information campaign. The campaign-level multiplier best captures the specific context of an individual campaign, but suffers sometimes from lack of scale.

Thus, each succeeding level captures missed visits more accurately, but may suffer from more fluctuation due to lack of scale.

Within each information campaign, there may be several document groups each associated with one or more brands, for which the corresponding multipliers can be applied. For example, for an information campaign for a brand, there may be a document group targeting mainly adult male mobile users, a document group targeting mainly adult female mobile users, a location-based document group (LBA) targeting mainly mobile users who are determined to be in one or more specified places, and on-premise document group targeting mainly mobile users who are determined to be on the premise (or business center) associated with the brand. In certain embodiments, a two step-process is used to derive the SVR for this information campaign. First, a SVR_multiplier is determined for each of the document groups, except the location-based document groups (LBAs) and the on-premise document groups, which are excluded from the need for an SVR multiplier because these audiences have already been previously seen visiting the locations via information requests and panel data packets, thus are less likely to exhibit lost visits. Afterwards, a weighted average can be taken to derive the final SVR.

This method is applicable to information campaigns with both low and high observed SVRs. For the former type, the calculation can simplify be performed by applying the brand-level multipliers due to the lack of LBAs. For instance, consider an information campaign for Subway with an observed SVR of 0.39 percent. For this campaign, using the country-level multiplier of 3.9 results in a SVR of 1.54 percent, which is likely an underestimation given historical data. Indeed, panel-based analysis indicates that request-based tracking is underestimating count of visit to Subway by a factor of approximately 16. Because this campaign has no LBAs, a brand-level multiplier of 15 can simply be applied to the observed SVR to yield 5.86 percent, a result more in line with expectations.

In another example, consider an information campaign for four retailers—Target, Walgreens, CVS, and Rite Aid—with a relatively high observed SVR of 7 percent. Using the country-level multiplier SVR estimation, the reported SVR would be overestimated at 28 percent. Using the new method with brand-level multipliers and exclusion of LBAs, SVR is calculated to be a more reasonable 16 percent. Use of brand-level multipliers also yields more insight regarding location visitation patterns at these brands.

In certain embodiments, the evaluation module 170 includes both the components for panel-based SVR estimation and components for frequency-bracket based SVR estimation, and selects the result from one of the techniques based on a few factors, such as: (1) whether there are panel data available; whether there are sufficient request data to divide into a sufficient number of frequency buckets, etc. The evaluation module 170 could also take an average of the SAR estimates from both techniques.

In certain embodiments, the computation engine 570 is configured to model the SVR estimation as a typical Bernoulli process, where each user has a given probability of p to visit a location. The confidence interval for p estimation is therefore:

$$\pm z\sqrt{\hat{p}(1-\hat{p})/n}$$

where z is 1.96 for 95% confidence level, $\hat{p}$ is the observed location visitation rate SVR. In the case of applying a multiplier to the observed SVR for projection purpose, the same multiplier is applied to the confidence interval.

Figure 10:
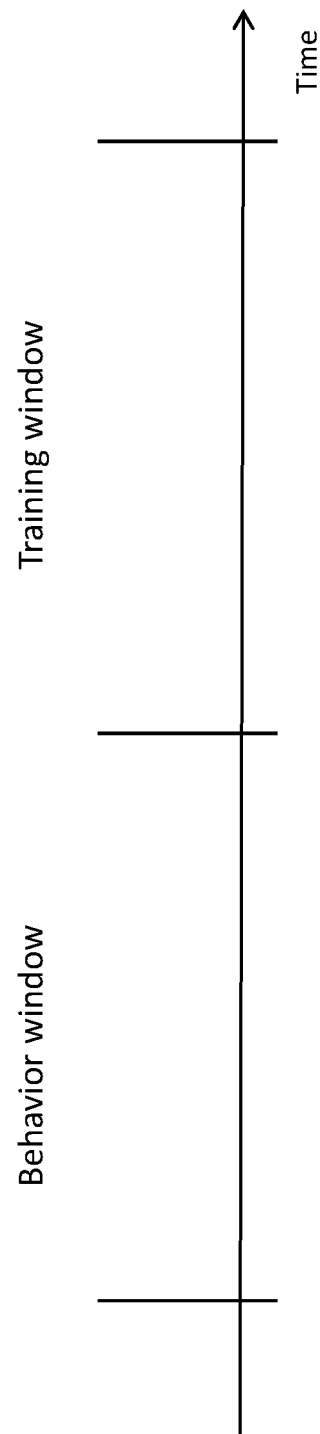
FIG. 10 is a diagram illustrating time windows for deriving a model function for predicting targeted off-line responses according to certain embodiments.

In further embodiments, the valuation module 170 is further configured to estimate SVR using user level behavior data. As illustrated in FIG. 10, for each user observed by system 150, its location history is observed during a first period of time (observation window), which defines a set of features forming a feature vector X. In a second period of time (i.e., the adjacent training window), if the same user (or mobile device) is observed to have visited one of the targeted locations, a target value y=1 is set for the mobile device, otherwise y=0. Multiple users' behavior data are thus obtained and are used to train an estimation model y=f(X) using machine learning. The estimation model is then used to predict a visitation likelihood y given a known behavior feature vector X for a user. In one embodiment, the feature vector X is defined as (x1, x2, . . . , xn), where xi is the normalized visitation frequency by the user to locations associated with each of a set of n different documents, i.e., $$xi=SVi/SVAi$$

where SVi is the visitation frequency by the user related to the $i^{th}$ document within an observation window, and SVAi is the average visitation frequency of a group of users related to the $i^{th}$ document. Index i is in the range of (1, 2, . . . , n) where n denotes the number of documents (or brand) used to represent a user's location feature space. In this setup, the estimation model y=f(X) is to capture the user's behavior pattern's correlation with future location visitation. The model fitting could be realized using machine learning for training either linear models such as Logistic Regression or nonlinear models such as neural network models.

Figure 11A:
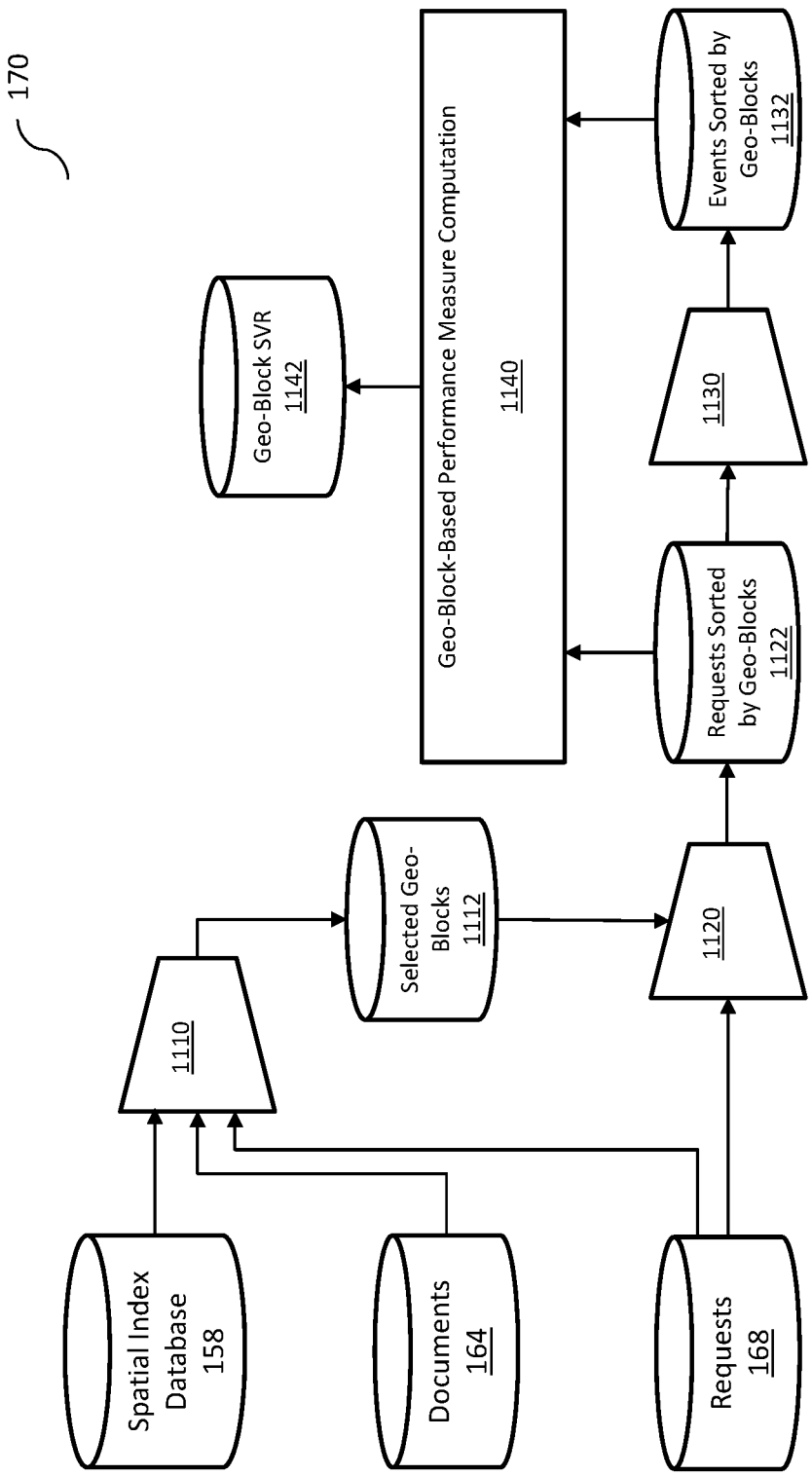
FIG. 11A is a block diagram illustrating certain functional units in the evaluation module in the information system according to further embodiments.

In further embodiments, an SVR could be estimated for each of a plurality of geo-blocks in the vicinity of for any given group of branded locations associated with the document. As shown in FIG. 11A, the evaluation module 170 may further include a geo-block filter 1110 configured to filter the geo-blocks in the spatial index database 158 for a plurality of geo-blocks related to the document. This can be done by building a query using the information associated with the document, such as name/brand/category, targeted demographic, targeted locations, etc., and search the spatial index database 158 for geo-blocks with meta data matching the query. The evaluation module 170 further includes a request filter 1120 that filters the annotated request in the requests database 168 for relevant requests that are annotated with the each geo-block among the matching geo-blocks, and stores the data associated with the relevant requests together with the each geo-block in a data store 1122, as shown in FIG. 11B. As discussed above, a request annotated with a geo-block indicates a detected location of an associated mobile device having been in the geo-block.

The evaluation module 170 further includes a site visit filter 1130 that filters the annotated request in the data store 1122 for relevant requests that are annotated with at least one place associated with the document indicating a site visit event, and stores the data associated with the site visit events in a data store 1132, as shown in FIG. 11B. The evaluation module 170 further includes a computation engine 1140 configured to compute a site visit rate (SVR) each of the matching geo-blocks and stores the SVR in the geo-block SVR store 1142. In certain embodiments, the SVR for each geo-block is computed as the ratio of the number of unique mobile devices having visited both the geo-block and a site associated with the document and the number of unique mobile devices having visited the geo-block. Such an SVR indicates a likelihood of a visit to the site by a mobile user detected to be in the geo-block and is thus used to derive a performance measure of the document corresponding to the specific geo-block as follows:

$$PM|_{SV}=CPV*SVRest|_{GB}*1000$$

where $SVRest|_{GB}$ is the SVR estimate for the specific geo-block.

Referring back to FIGS. 4A and 4B, in certain embodiments, the ranking unit 405 in the information server 156 is configured to determine the KPI for each of the one or more matching document by first determining the type of performance measure or pricing model associated with the document. For example, if the performance measure is CPM-based, the performance measure can simply be the price a sponsor of the document has offered to pay for each impression and the KPI can be equal to the performance measure. If the performance measure is CPC-based or CPI-based, the ranking unit 405 can use the PM|CC value or the PM|SA value determined by the evaluation module 170, as discussed above.

If the performance measure is CPV-based, the ranking unit 405 would at first determine whether the annotated request is annotated with a geo-block having a $PM|_{SV}$ or $SVRest|_{GB}$ value determined for that geo-block. If so, the ranking unit 405 may proceed to determine the KPI using the $PM|_{SV}$ or $SVRest|_{GB}$ value associated with the geo-block. On the other hand, if the annotated request is not annotated with such a geo-block, the ranking unit 405 would use the $PM|_{SV}$ value computed using the panel multiplier or frequency bucket techniques, whichever one is produced by the evaluation module 170. The ranking unit 405 may determine the KPI as the $PM|_{SV}$ value multiplied by a weight that is based on the type of place related to the document in the annotated request and/or the time stamp of the annotated request. For example, different weights can be given to visits to different sites, or to different types of places at the same site. For example, some retailers may be willing to pay higher rate for a visit to a business center (BC) place than a visit to a business premise (BP) place, or vice versa. Also, different weight can also be applied to different time stamps. For example, some retailers may be willing to pay higher rate for Tuesday visits than weekend visits.

Figure 4C:
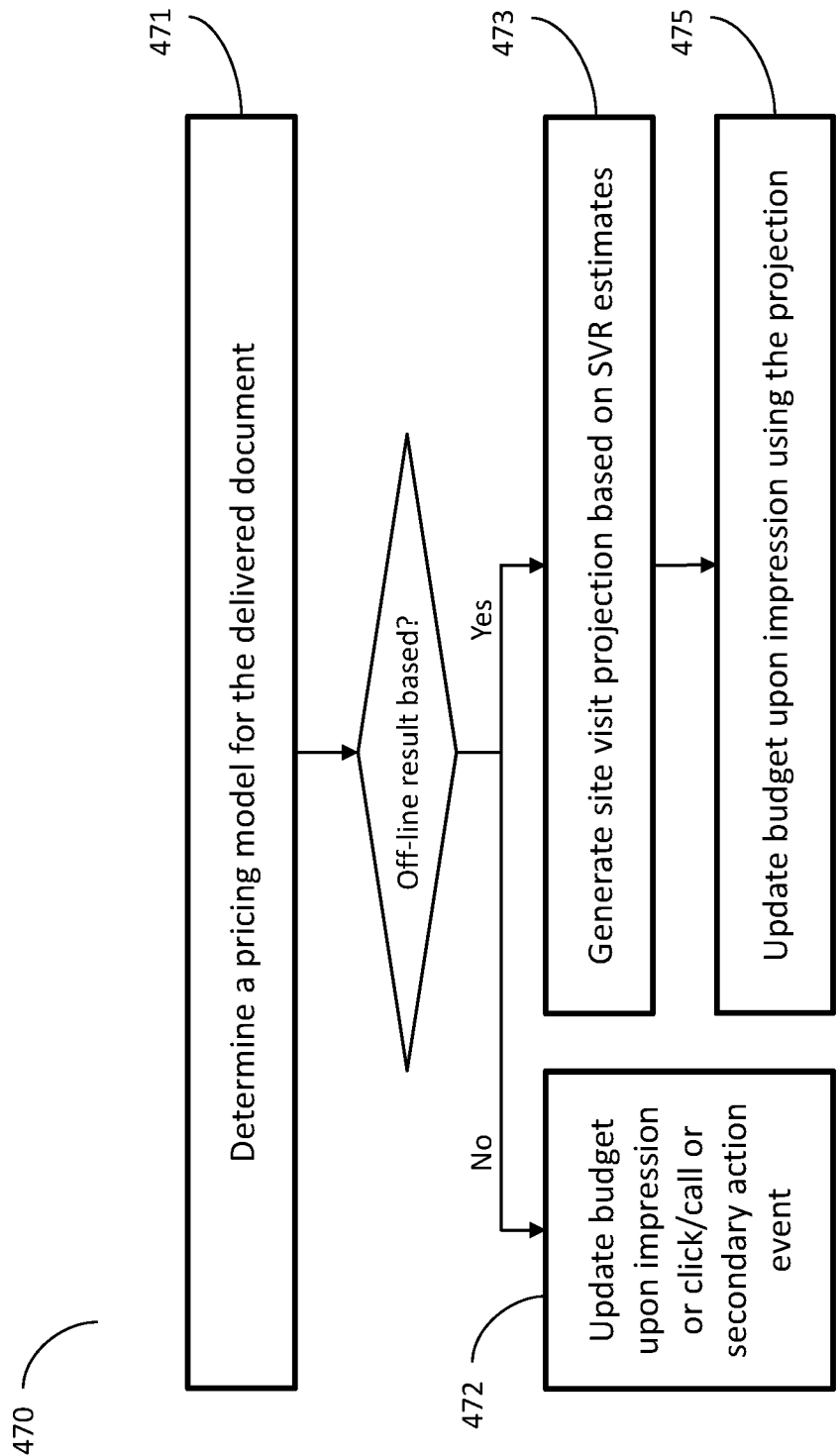
FIG. 4C is a flowchart illustrating a method performed by a volume control unit in the information server according to certain embodiments.

In certain embodiments, as shown in FIGS. 4A through 4C, the information server 154 further includes a budget control function in the volume control unit 409, which adjusts or updates (470) the associated campaign budget based on the corresponding pricing model, and removes documents running out of budget from the documents pool. Thus, the volume control unit 409 first determines (471) what pricing model is associated with the delivered document. For on-line result focused pricing models such as CPM, CPC, or CPI, this can be done after the information server 154 receives (460) signals indicating an impression/click/call/SA event, which typically happens within seconds or minutes after the delivery of the document. The related budget is updated (472) by deducting the cost for the impression/click/call/SA from the budget. For off-line result, it is tricky because a site visit may happen hours or days after the impression. By the time when it happens, the budget for the campaign may have already run out, or the campaign window is closed and not enough site visits are produced to make up for the cost of the campaign.

Thus, in certain embodiment, the volume control unit 409 is configured to generate (473) a site visit projection based on the SVR estimates upon receiving signals indicating the CPV-based document has been impressed, instead of waiting until a site visit actually occurs. The projection can be the cost per visit offered by the sponsor of the document multiplied by the estimated SVR used in the ranking module 405 to estimate the KPI. It may be further multiplied by the weight used by the ranking unit 405. The volume control unit 409 then updates (475) the related budget by deducting the projection from the budget.

Figure 12A:
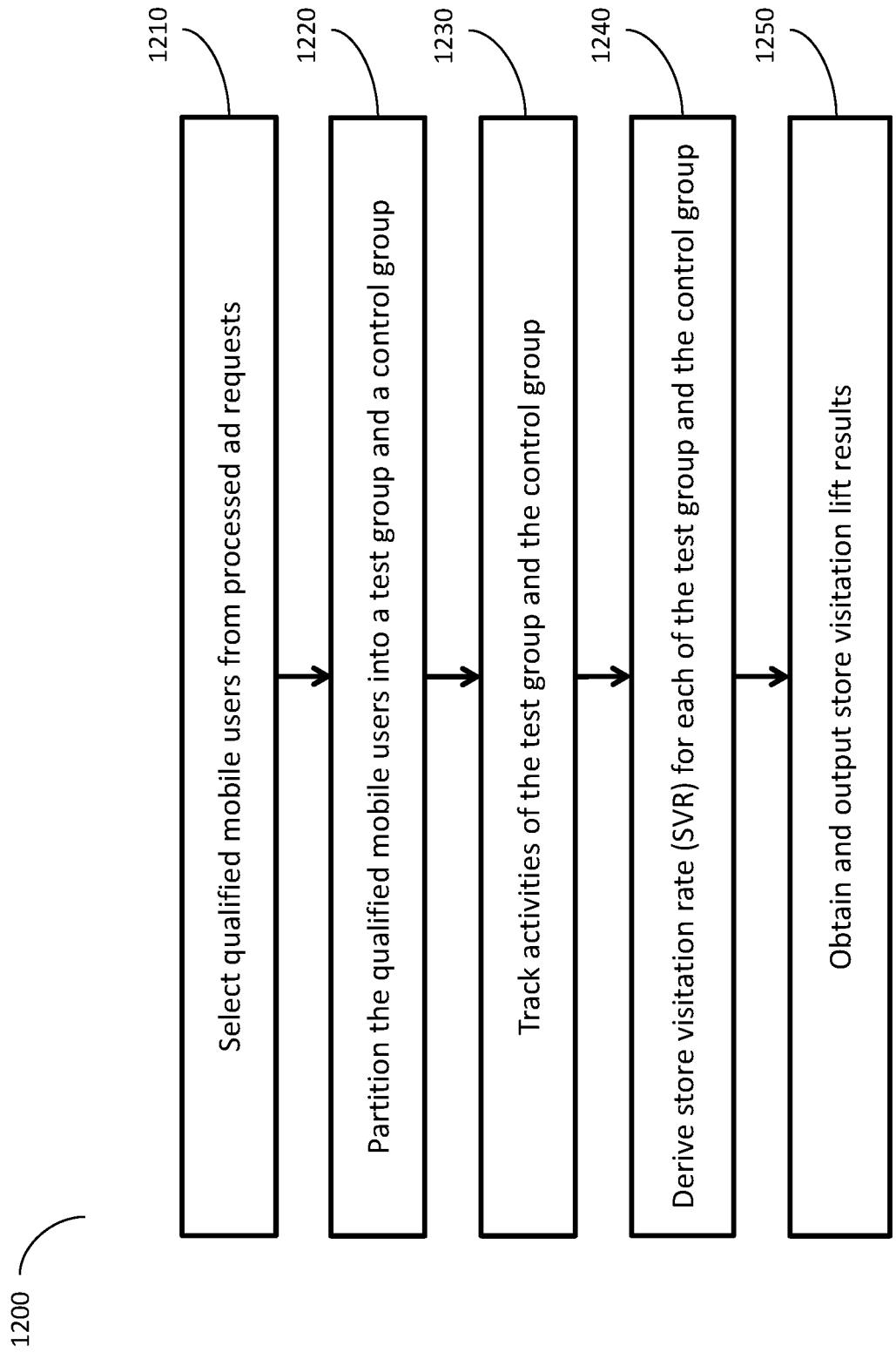
FIG. 12A is a flowchart illustrating a method for lift measurement according to certain embodiments.

In some embodiments, the evaluation module 170 further includes a lift analysis module (not shown) configured to generate store visitation lifts as a performance measure. FIG. 12A illustrates a method 1200 performed by the lift analysis module for measuring performance of information campaigns without using static panels. According to certain embodiments, method 1200 comprises identifying (1210) qualified requests as the request server 130 is processing information requests in real-time or afterwards from the request log 168 and/or impression log 512, partitioning (1220) mobile devices associated with the qualified requests into a test group and a control group, tracking (1230) activities for the test group and control group using data in the site visits data store 542, deriving (1240) targeted response rate (e.g., store visitation rate) (SVR) for each of the test group and the control group, and obtaining (1250) lift results from the store visitation rates.

Figure 12B:
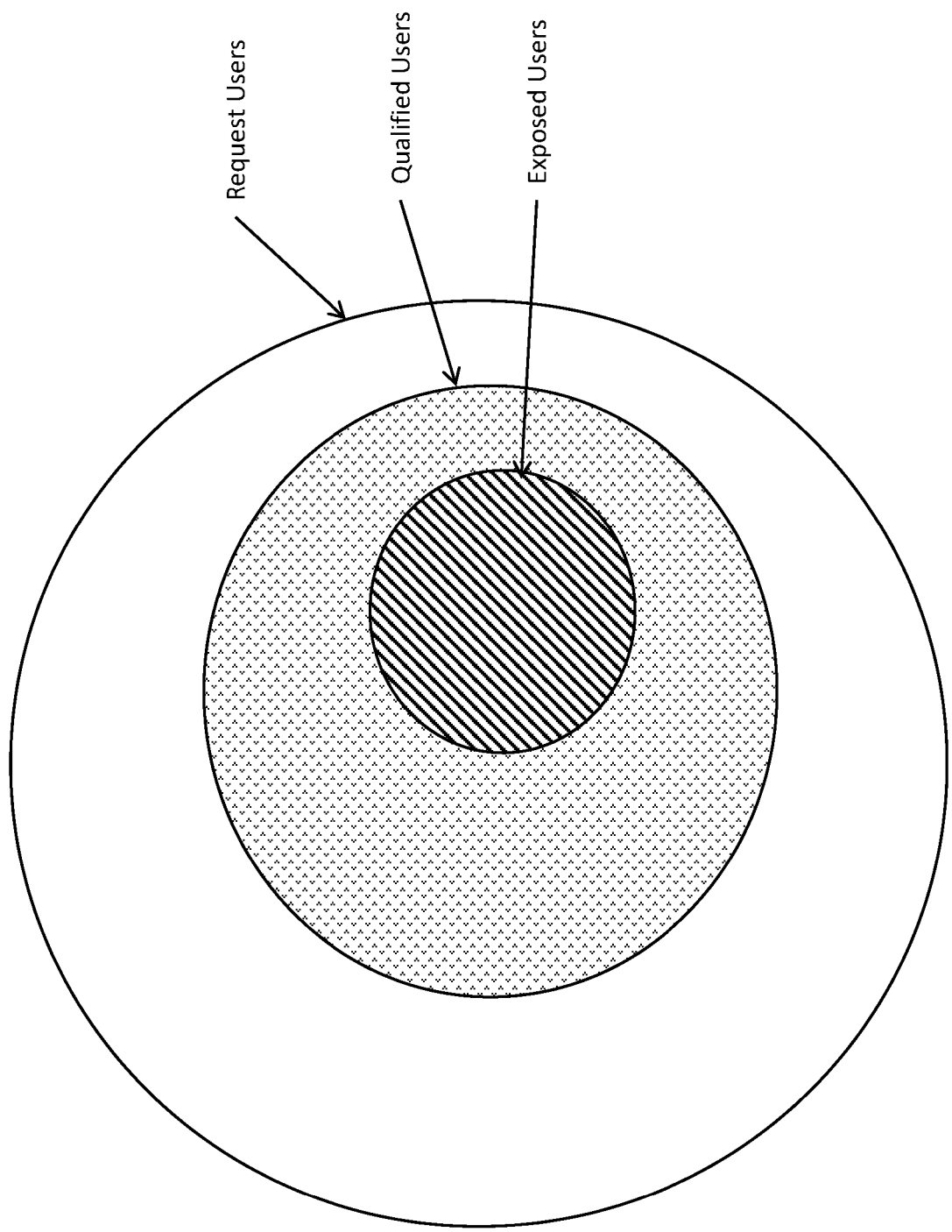
FIG. 12B is a diagram illustrating three different categories of mobile devices (or users) according to certain embodiments.

As shown in FIG. 12B, the mobile devices (or their users) associated with the requests are categorized by the lift analysis module into three groups: the request users, the qualified users and the exposed users. FIG. 12B visualizes the relationship between request users, qualified users and exposed users for a given information campaign. Each of the request users can be any user who is associated with at least one request during the flight of the information campaign. Out of the request users, those who are associated with information requests that qualify for the information campaign are referred to as the qualified users. In certain embodiments, an information request qualifies for the information campaign if it meets certain targeting criteria (demographic, time of the day, location, etc) of the information campaign.

In typical ad serving systems based on Real Time Bidding (RTB), a qualifying request does not always get fulfilled and thus results in an impression event. For example, an ad campaign may run out of daily budget, or the same request qualifies for more than one campaigns, or the request server 130 does not win the bidding, especially in an RTB pricing competition, or the creative (document) specified by the request server 130 fails to impress on the associated mobile device due to incompatibility issues, etc. Thus, out of the qualified users, those who have been shown the ads in response to the associated requests are categorized as the exposed users.

Thus, the lift analysis module determines mobile device groups for lift measurements based on data in the request log 168 and/or the events log 166. The lift analysis module partitions users and/or devices into a control group (control panel) and a test group (test panel) for a respective information campaign, where a user and/or device is represented by a UDID, IDFA or GIDFA for mobile phones, or by a cookie or login id associated with a publisher. Both panels are dynamically extracted from the requests seen by the ad delivery systems during a flight of the information campaign.

In certain embodiments, the lift analysis module selects all or a subset of the exposed users as the test panel, and selects all or a subset of the qualified users who are not exposed users as the control panel. In certain embodiments, the lift analysis module includes a tagging function and an aggregation function. The tagging function runs in conjunction with the request server 130, which generates the request log 168 and the events log 166.

The request log 168 keeps track of requests and the information campaigns for which they qualify, in the form of, for example, a tuple of (user_id, ad_1, ad_2, ..., ad_n) for each qualifying request, where user_id represents the mobile user of the request, and (ad_1, ad_2, ..., ad_n) indicates the information campaigns for which the request qualified. The events log 166 records each user successfully impressed with the relevant information associated with an information campaign, which is presented as an array of (user_id, ad_id) pairs according to certain embodiments.

The lift analysis module processes the request log 168 and the events log 166 for each information campaign to determine a list of users who have been exposed to the campaign as the test group, and a list of users who qualify for the campaign, but not exposed to the campaign as the control group.

Given the test group and control group, the lift analysis module measures the targeted responses of the users in both groups, such as store visitation, purchase, etc. that occur after mobile users in the groups have been determined to be qualified users. The lift analysis module makes use of the control group and test group data in the request database 168 and some third party data or first party data obtained via the network 110 and/or stored in the request database 168 to obtain records of the post-exposure activities of users in the control group and the test group. The third party data could be user purchase activities tracked by online tracking pixels on check-out pages, or tracked by mobile payment software such as Paypal. The purchase activities could also be obtained from first party data such as sales reports coming directly from the advertisers.

In certain embodiments, the interested user activity is store visitation (SV), and the type of information campaigns are mobile advertising (ad) campaigns, where the ad requests include mobile user location information. In certain embodiments, the store visitation (SV) activities of the test group users and the control group users can be derived from their associated subsequent ad requests logged in the requests database 168. FIG. 3D illustrates examples of logged requests in the requests database 168, which includes, for each logged request, the user ID (UID) or device ID, the maker/model of the mobile device, the age, gender and education level, etc. of the mobile user, one or more business/brand names the device location has triggered, the type of place the device location has triggered (e.g., type X for business premise, type Y for parking lot or shopping center near the business, and type Z for street block in which the business is located, etc.), and the time of the request, etc. In certain embodiments, the business/brand names associated with an ad request is derived using a method described in co-pending U.S. patent application Ser. No. 14/716,811, filed May 19, 2015, entitled "System and Method for Marketing Mobile Advertising Supplies," which is incorporated herein by reference in its entirety. In certain embodiments, the lift analysis module searches through the logged requests to look for entries associated with mobiles users in the control group and test group and to check if these entries also include device locations and/or business/brand name(s) that indicate store visitation events desired by the ad campaign.

In some embodiment, an SV event is attributed to a user in the test group only if the visit occurs within a specified period (e.g., 2 weeks) after the impression was made. Similarly, an SV event is attributed to a user in the control group only if the visit occurs within a specified period after the user has been qualified for the ad. In some embodiments, "employees" of a store are derived from frequency and/or duration of associated SV events, and are removed from test and control groups.

In certain embodiments, the lift-analysis module derives activities metrics for the control group and the test group and generates store visitation lift results. For example, a store visitation rate metric can computed for each of the test group and the control group as follows:

$$SVR = \frac{(\text{Number\_of\_Unique\_Users\_Who\_Visited\_the\_Targeted\_Store})}{(\text{Number\_of\_Unique\_Users\_in\_the\_Group})}$$

In certain embodiments, if there are multiple exposures followed by a visit, only one visit is considered in the above SVR calculation. In certain embodiments, if there are multiple visits following an exposure, only one visit is considered in the above SVR calculation.

A store visitation lift measure can be computed as:

$$SVL = \frac{SVR\_test}{SVR\_control} - 1$$

If the performance goal is purchase, a corresponding set of metrics could be defined for performance measure.

The above calculation is based on the assumption that the test panel and the control panel are balanced over major meta data dimensions. In certain embodiments, the lift analysis module is configured to make sure the panel selection process is balanced over major meta data dimensions. For example, if a campaign is not targeting by gender, then the lift analysis module has to make sure that the control panel and the test panel should have an equal mixture of male and female in order to remove gender bias. If a campaign is not targeting any particular traffic sources (a mobile application or a website), the panel selection should also avoid skewed traffic source distributions between two panels.

Figure 13B:
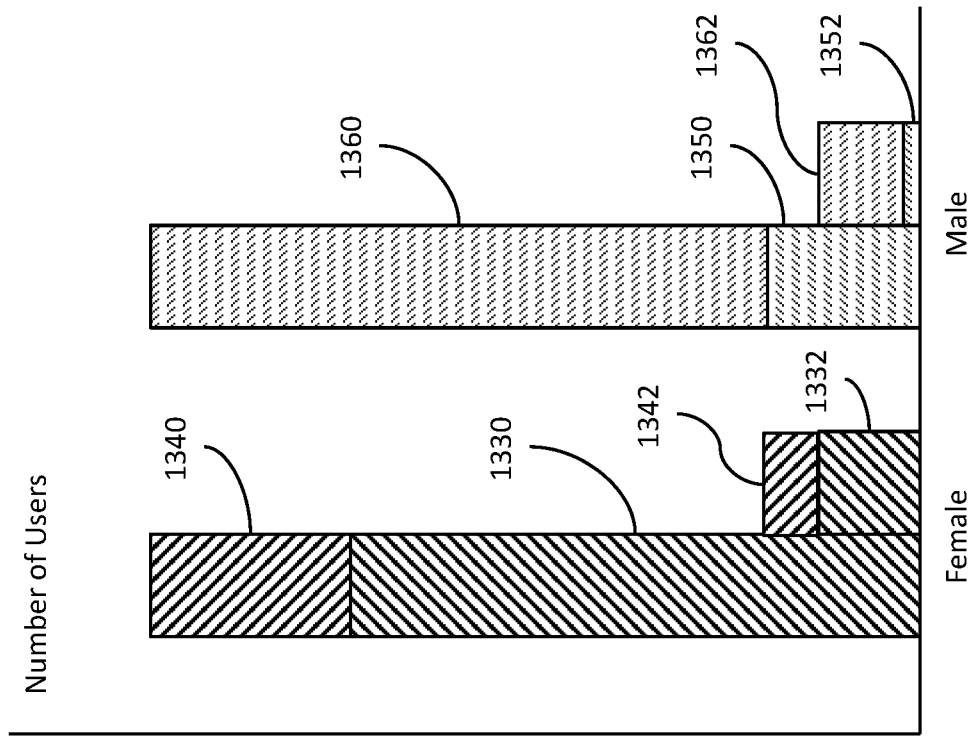
FIGS. 13A and 13B are bar charts illustrating possibly different composition of mobile users in a test group and a control group selected for lift analysis according to certain embodiments.
Figure 13A:
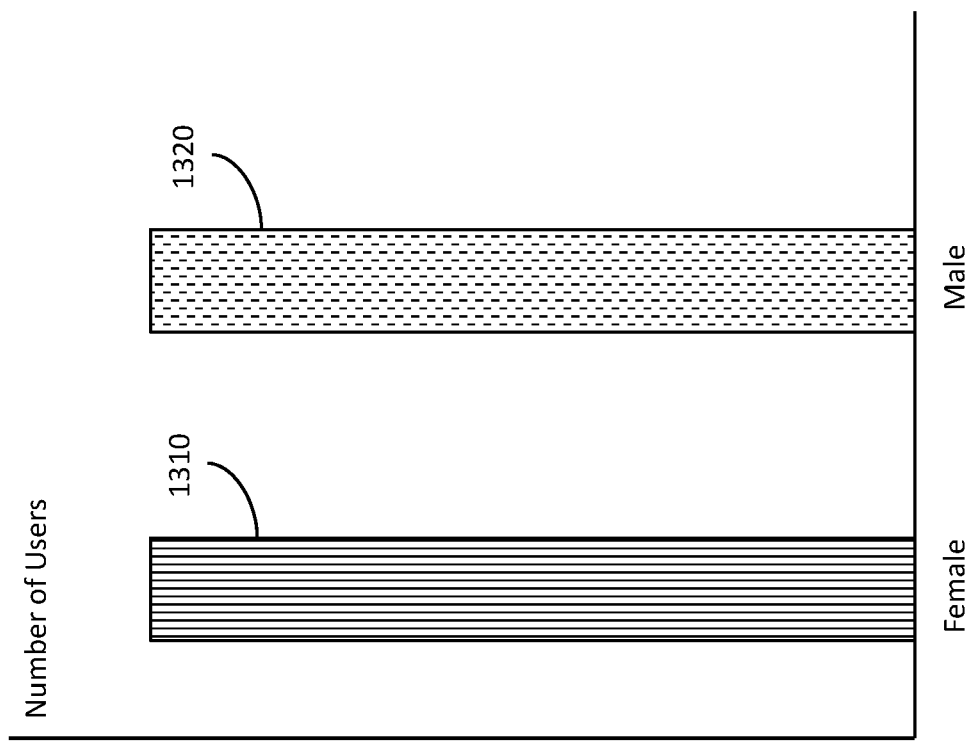

FIGS. 13A and 13B illustrate examples of how gender bias can be created during the panel selection process, which can result in skewed ad lift calculations. As shown in FIG. 13A, if a campaign is not targeting by gender, then the qualified users should include about equal numbers of male users (810) and female users (820). In practice, however, the ad serving process may create gender bias, resulting in the control panel and the test panel having unequal female/male ratios. For example, FIG. 13B illustrates an apparent imbalance in the female/male ratios for the test panel and the control panel. As shown in FIG. 13B, block 1330 represents the number of female users exposed to the campaign and thus allocated to the test group while block 1340 represents the number of female users not exposed to the campaign and thus allocated to the control group. Likewise, block 1350 represents the number of male users exposed to the campaign and thus allocated to the test group while block 1360 represents the number of male users not exposed to the campaign and thus allocated to the control group.

Referring still to FIG. 13B, block 1332 represents the users in block 1330 that have had at least one post-exposure SV event, while block 1342 represents the users in block 1340 that have had at least one SV event without any exposure to the ad campaign. Likewise, block 1352 represents the users in block 1350 that have had at least one post-exposure SV event, while block 1362 represents the users in block 1360 that have had at least one SV event without any exposure to the ad campaign. To illustrate how the imbalance shown in FIG. 13B can generate skewed or even erroneous ad lift results, assuming that the total number of qualified users is 2000 including 1000 female users in block 1310 and 1000 male users in block 1320 in FIG. 13A, Table I below lists exemplary numbers of users in the blocks in FIG. 13B.

As shown in Table I, because of the imbalance of the female/male ratios in the test group and the control group, even though exposure to the ad campaign did not make any difference in the percentage of male or female users having had SV events (in both the test group and control group, the percentage of female users having had SV events is about 20% and the percentage of male users having had SV events is about 10%), the SVL calculation still produced a positive result, indicating an ad lift.

In certain embodiments, to avoid generating such skewed or erroneous lift results, the lift analysis module is configured to insure balance over major meta data dimensions. For example, in the case shown in FIG. 13B, the lift analysis module can remove a portion (e.g. 500) of the female users in the test group and a portion (e.g. 500) of the male users in the control group to insure balance in the female/male ratios in the two groups, as shown in Table II.

Alternatively, especially when there is not an ample number of qualified users, it would be better to keep the number of users in each panel and make adjustment during the analysis stage. For example. The lift analysis module can multiply the numbers of users in the less populated meta data sections to create an artificial balance between the groups, as shown in Table III.

TABLE I

|  | Test | | Control | |
| --- | --- | --- | --- | --- |
|  | F | M | F | M |
| Number of Users in Group | 750 | 250 | 250 | 750 |
| Number of Users with SV events | 150 (20%) | 25 (10%) | 50 (20%) | 75 (10%) |
| SVR |  175/1000 = 0.175 | | 125/1000 = 0.125 | |
| SVL |  0.175/0.125 − 1 = 0.4 | | | |

TABLE II

|  | Test | | Control | |
| --- | --- | --- | --- | --- |
|  | F | M | F | M |
| Number of Users in Group | 250 | 250 | 250 | 250 |
| Number of Users with SV events | 50 (20%) | 25 (10%) | 50 (20%) | 25 (10%) |
| SVR | 75/500 = 0.15 | | 75/500 = 0.15 | |
| SVL | 0.15/0.15 − 1 = 0 | | | |

TABLE III

|  | Test | | Control | |
| --- | --- | --- | --- | --- |
|  | F | M | F | M |
| Number of Users in Group | 750 | 750 | 750 | 750 |
| Number of Users with SV events | 150 (20%) | 75 (10%) | 150 (20%) | 75 (10%) |
| SVR | 225/1000 = 0.225 | | 225/1000 = 0.225 | |
| SVL | 0.225/0.225 − 1 = 0 | | | |

In certain embodiments, as discussed above with reference to FIGS. 6C-6E, an ad campaign flight (i.e., duration of an ad campaign) is divided to include multiple windows, and store visit lift is first calculated for each window and then averaged over the multiple windows to arrive at the final lift. This approach is necessitated by the fact that there is a greater chance for a user to be in the test user group as the ad campaign proceeds. For example, an ad campaign flight may last several weeks, with an increasing number of mobile users becoming exposed to the ad campaign as the number of impressions increase over the course of time, as illustrated by the curve 610 in FIG. 9A. Thus, if the test group and control group are determined based on the ad requests received during the whole flight of the campaign, a skew in the sizes of the control and test user groups may result because a user not exposed to the ad campaign during the 1st week of the ad campaign may encounter the ad campaign in subsequent weeks. Note that a mobile user can be exposed to the ad campaign multiple times during the campaign flight, so the number of impressions in FIG. 6A do not necessarily equal to the number of exposed mobile users.

To overcome this skew, as shown in FIG. 6B, the flight of the ad campaign is divided to include multiple exposure windows, e.g., EW1, EW2, . . . , and EW6, each is associated with a visit attribution window, e.g., AW1, AW2, . . . , and AW6, respectively. For each exposure window, the control user panel and test user panel is determined based on ad requests and ad delivery during the exposure window, and a lift is computed based on store visits during the associated visit attribution window. The panelists and store visit lift metric for each exposure window are determined as described above. An overall visit lift is computed by averaging over the multiple exposure windows, as shown below:

$$SVL = \text{Average}(SVL_i), \text{ where } SVL_i \text{ is the lift computed for the } i^{th} \text{ exposure window}$$

Table IV shows an example of an overall SVL for an ad campaign computed using six exposure windows:

TABLE IV

| EW1 | EW2 | EW3 | EW4 | EW5 | EW6 | Overall |
| --- | --- | --- | --- | --- | --- | --- |
| 5% | 10% | 15% | 10% | 5% | 15% | 10% |

In FIG. 6D, each lift attribution window (e.g., AW1) is shown to overlap with its associated exposure window (e.g., EW1). In this case, store visits occurring during an exposure window (e.g., EW1) as well as afterwards are considered in the calculation of the store visit lift for the exposure window (e.g., $SVL_1$), even though the test group and control group are determined at the end of the exposure window. In other embodiments, as shown in FIG. 6E, each lift attribution window (e.g., AW1) does not overlap with its associated exposure window (e.g., EW1). Thus, store visits occurring during an exposure window (e.g., EW1) are not considered in the calculation of the store visit lift for that exposure window (e.g., $SVL_1$).

In certain embodiments, the effect of an ad exposure on a user in the test group is made to decay over time. Thus, as the lag between ad exposure and store visitation increases, the effect of the ad exposure contributing to that visit decreases. To avoid over statement in the store visit lift calculation, a user who was in the test group initially can drift to the control group as the ad campaign proceeds unless that user is exposed to the ad campaign again. In certain embodiments, a decay function is defined which determines the contribution of a user to either the test group or the control group based on how long ago the user has been exposure to an ad campaign. A user is 100% in the test group the day the user is exposed to the ad campaign and this contribution percentage decreases as the ad campaign proceeds until the user is exposed again. The remaining percentage of the user is counted towards the control group. Thus, at the end of an exposure window, the number of users in the test group ($N_T$) and the number of users in the control group ($N_C$) can be computed as follows:

$$N_T = \Sigma F(T-T_j), \text{ and}$$

$$N_C = \Sigma (1 - F(T-T_j)),$$

where $T_j$ represents the time the $j^{th}$ qualified user is exposed to the ad campaign, T represents the time at the end of the exposure window, $F(T-T_j)$ represents the decay function, and the sum is over the qualified users. The decay function can be a linear decay function, e.g., $$F(T-T_j) = 1 - (T-T_j)/(T-T_0),$$

where $T_0$ represents the beginning time of the exposure window. The decay function can also be an exponential function, e.g., $$F(T-T_j) = e^{-(T-T_j)/(T-T_0)},$$

or any other decay function suitable for the particular ad campaign.

Figure 14:
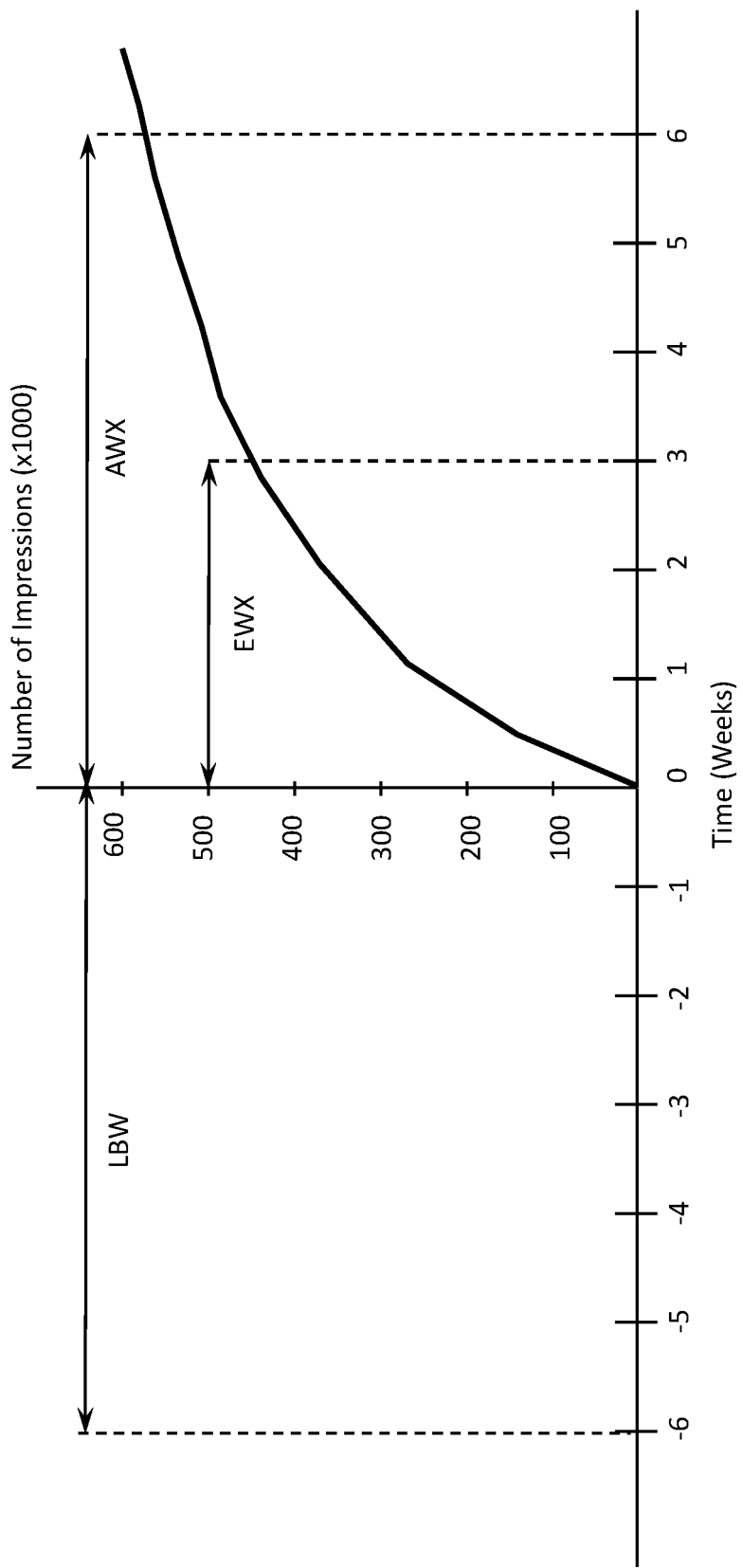
FIG. 14 is a plot illustrating an information campaign flight and selection of a look-back window for computing a natural tendency measure to account for stronger tendency for targeted responses of users in the test group that is not attributed to exposures to an ad campaign.

If an ad campaign is targeting users who have a stronger natural propensity to visit a store, the test group may be made of an unnaturally large percentage of such users and the lift computation may overstate the effect of ad campaign. In certain embodiments, the stronger natural tendency that some of the users in the the test group have towards visiting a store associated with an ad campaign is computed and taken off the store visit lift computation, so as to avoid overstating the effect of the ad campaign. In certain embodiments, as shown in FIG. 14, to capture and remove the above-stated bias, store visit records of mobile users in a window of time (look-back window, or LBW) before the start of an ad campaign are examined and used to compute a natural tendency measure (NTM) for mobile users in the test group, even though these mobile users are allocated to the test group at the end of an exposure window (EWX) during the campaign.

In this process, a control user panel or control group and a test user panel or test group are determined based on qualifying ad requests processed during the exposure window (EWX). The lookback window (LBW) before the start of the campaign is selected to be immediately before the campaign and preferably of the same or similar size as an attribution window (AWX) associated with the EWX. The natural tendency measure (NTM) for the mobile users in the test group can be computed using one of the above-described methods for calculating store visitation lift, as if the users in the test group had been exposed to the ad campaign. In other words, store visit rates is computed for these two groups of users during the lookback window (LBW) before the start of the ad campaign, and are used to compute a "store visit lift" for the look-back window ($SVL_{Look-Back}$). The store visit lift ($SVL_{campaign\ flight}$) during the campaign flight is computed as described above, and the net store visit lift is measured as:

$$SVL = SVL_{campaign\ flight} - NTM, \text{ where}$$
$$NTM = SVL_{Look-Back}.$$

Table V illustrates an example of the results of a net store visit lift calculation that remove the bias caused by stronger natural tendencies for store visit of test group users.

TABLE V

| $SVL_{campaign\ flight}$ | NTM | SVL |
|---|---|---|
| 20% | 10% | 10% |

In some other implementations, the LBW could be selected to be a window that is not necessarily immediate before the start of the campaign. For example, a LBW could be selected to be a window somewhere before the start of the campaign but having the same mixture of week days and weekend days as the EWX or AWX window.

Alternatively, instead of using the LBW, a hash function can be built into the request fulfillment module 315 to deliberately skip some users whom the advertizer would otherwise choose to impress (e.g., users with a user ID number having a last or first digit being "0"). In other words, instead of trying to impress as many favored users (e.g., users with stronger natural propensity to visit a store) as possible and thereby moving as many such users as possible into the test group and leaving the rest of the users in the control group, the ad serving process can be configured to randomly select a percentage (e.g., 10%) of the favored users to form the control group. Thus, the control group is made mostly of those favored users who have been skipped by the ad serving process and who would otherwise end up in the test group during an exposure window. Thus, the user profiles in the control group and the test group are almost identical.

Ideally, the test group and the control group should have about the same number of users. Such an ideal situation, however, cannot simply be achieved using a higher percentage (e.g., 50%) hash function because not all of the processed request sent to the an information server, e.g., mobile publishers, ad middleman, and/or ad exchanges, etc., actually result in impression. Thus, a 50% hash function would result in less users in the test group than in the control group and sacrifice of an excessive amount of request inventory to create the control group comprised of similar mobile users as in the test group. To resolve this issue, the request fulfillment module 315 uses a 10% hash function and includes a counter that keeps a count that reflects a different between the number of mobile users in the test group and the number of mobile users in the control group. Everytime when the feedback from the information server indicate an impression in response to a favored request for a certain campaign, the count increases by 1, and everytime when a favored request is assigned to the control group, the count decreases by 1. The request fulfillment module 315 is designed such that this favored request is only assigned to the control group when the count is 1 or larger. Thus, in the beginning, more favored requests result in impressions than assigned to the control group and the count increases more than decreasing because of the 10% hash function. But, after the campaign starts to run out of budget, more favored requests are assigned to the control group than resulting in impressions, until the count reaches 0. Thus, not only that the user profiles in the control group and the test group are almost identical, the numbers of users in the control group and the test group are almost equal, ensuring that the bias caused by the ad serving process favoring certain users is removed.

Figure 15:
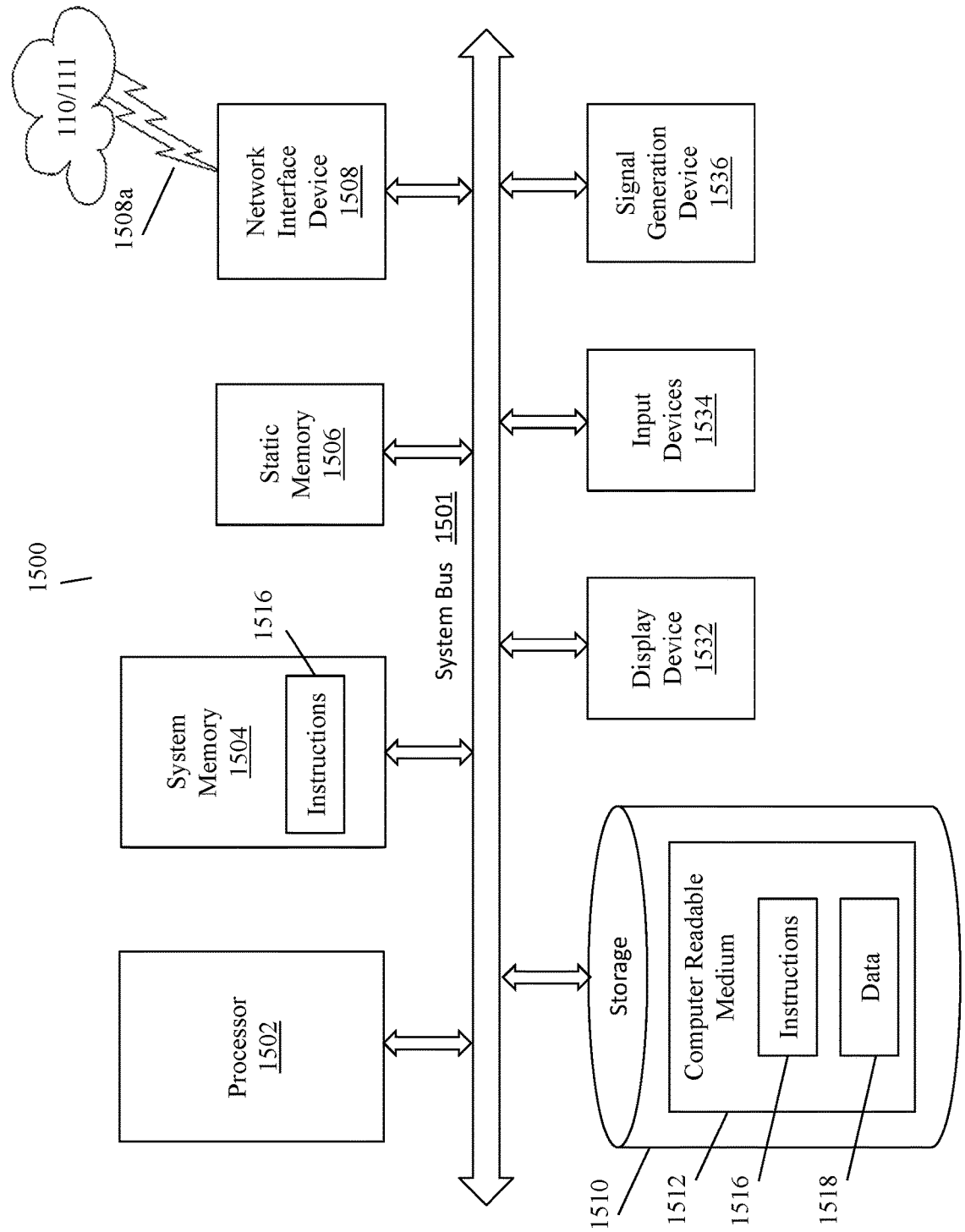
FIG. 15 is a diagrammatic representation of a computer/server that performs one or more of the methodologies and/or to provide part or all of the information system according to embodiments.

FIG. 15 illustrates a diagrammatic representation of an exemplary computer/server 1500 that can be used to provide any one or more components in the system 150 by executing proprietary software instructions. In some embodiments, the system 150 includes one or more computers/servers 1500, each configured to function as one or more of the request processor 152, the information server 154, and the various filters and engines in the evaluation module) and/or to provide one or more of the databases in system 150. The computer/server 1500 may operate as a standalone device or as a peer computing device in a peer-to-peer (or distributed) network computing environment. As shown in FIG. 15, the computer/server 1500 includes one or more processors 1502 (e.g., a central processing unit (CPU), a graphic processing unit (GPU), and/or a digital signal processor (DSP)) and a system or main memory 1504 coupled to each other via a system bus 1500. The computer/server 1500 may further include static memory 1506, a network interface device 1508, a storage unit 1510, one or more display devices 1530, one or more input devices 1534, and a signal generation device (e.g., a speaker) 1536, with which the processor(s) 1502 can communicate via the system bus 1501.

In certain embodiments, the display device(s) 1530 include one or more graphics display units (e.g., a plasma display panel (PDP), a liquid crystal display (LCD), a projector, or a cathode ray tube (CRT)). The input device(s) 1534 may include an alphanumeric input device (e.g., a keyboard), a cursor control device (e.g., a mouse, trackball, joystick, motion sensor, or other pointing instrument). The storage unit 1510 includes a machine-readable medium 1512 on which is stored instructions 1516 (e.g., software) that enable anyone or more of the systems, components, methodologies or functions described herein. The storage unit 1510 may also store data 1518 used and/or generated by the systems, components, methodologies or functions, including data in any, part, some, or all of the POI data 151, the map data 152, the spatial index database 158, the request log 168, the impression log 164, click/call log 166, the data filed 171, the segment database 174, the search index 925, etc. The instructions 1516 (e.g., software) may be loaded, completely or partially, within the main memory 1504 or within the processor 1502 (e.g., within a processor's cache memory) during execution thereof by the computer/server 1500. Thus, the main memory 1504 and the processor 1502 also constituting machine-readable media.

While machine-readable medium 1512 is shown in an example implementation to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1516) for execution by the computer/server 1500 and that cause the computing device 1100 to perform anyone or more of the methodologies disclosed herein. The term "machine-readable medium" includes, but not be limited to, data repositories in the form of solid-state memories, optical media, and magnetic media. In certain embodiments, the instructions 1516 and/or data 1518 can be stored in the network 100 and accessed by the computer/server 1500 via its network interface device 1508, which provides wired and/or wireless connections to a network, such as a local area network 111 and/or a wide area network (e.g., the Internet 110) via some type of network connectors 1580a. The instructions 1516 (e.g., software) and or data 1518 may be transmitted or received via the network interface device 1508.

We claim:

1. A method for information delivery to mobile devices via a packet-based network, comprising:
    at one or more computer systems coupled to the packet-based network, each of the one or more computer systems including at least one processor, the one or more computer systems further including or having access to one or more databases, the one or more databases including a requests database, a documents database and an events database, the requests database storing therein processed information requests associated with mobile devices communicating with the packet-based network, the documents database storing therein documents for transmitting to certain mobile devices in response to associated information requests, the events database storing therein impression events and click/call events, each impression event being related to a certain document having been impressed on a certain mobile device, each click/call event being related to a click made on an impressed document;
    receiving a real-time indication of a first impression event indicating a first document having been impressed on a first mobile device in response to a first request associated with the first mobile device;
    determining a pricing model associated with the first document;
    in response to the pricing model being impression-based, adjusting a budget associated with the first document based on the first impression event;
    in response to the pricing model being click/call-based, determining whether a click/call event associated with the first impression event occurs subsequent to the first impression event, and in response to receiving an indication that the click/call event associated with the first impression event having occurred, adjusting a budget associated with the first document based on the click/call event associated with the first impression event; and
    in response to the pricing model being off-line site-visit-based, determining an off-line site visit projection and adjusting a budget associated with the first document based on the off-line site visit projection.

2. The method of claim 1, further comprising:
    determining at least one performance measure for each of a plurality of documents in the documents database using at least data in one or both of the requests database and events database, the plurality of documents including the first document, the at least one performance measure including at least one of an impression-based performance measure, a click/call-based performance measure, and an off-line site-visit-based performance measure, the plurality of documents including one or more documents using off-line site-visit-based pricing model and having off-line site-visit-based performance measures.

3. The method of claim 2, further comprising, before receiving the indication of the first impression event:
    receiving the first request associated with the first mobile device, the first request including first location data and first non-location data derived from signals transmitted by the first mobile device;
    determining first location features based at least on the first location data;
    building a search query based on at least some of the first location features and the first non-location data;

searching the documents database using the search query to output one or more matching documents, the one or more matching documents including the first document;

selecting the first document among the one or more matching documents to fulfill the first request based least in part on one or more performance measures of the one or more matching documents; and transmitting data related to the first document to the packet-based network.

4. The method of claim 3, wherein the first location features include identification of one or more places where the first mobile device is determined to be at a time of the first request, and wherein the first document is associated with at least one of the one or more places.

5. The method of claim 2, wherein determining at least one performance measure for each of a plurality of documents in the documents database includes determining an off-line site-visit-based performance measure for a respective document, including:

determining, using data in the events database, a first number of mobile devices that have been impressed with the respective document during an exposure time window;

determining, using data in the requests database, a second number of mobile devices that have visited one or more places associated with the respective document during an attribution time window corresponding to the exposure time window; and determining the off-line site-visit-based performance measure for the respective document using at least the first number and the second number.

6. The method of claim 5, further comprising:

receiving and processing panel data packets from a group of mobile devices, each panel data packet including identification of an associated mobile device and location data indicating a location of the associated mobile device; and determining a calibration factor using processed panel data packets and processed requests associated with a subgroup of mobile devices, each of the subgroup of mobile devices being associated with at least one processed request in the requests database and with one or more panel data packets received by the request processor, wherein the off-line site-visit-based performance measure is further determined using the calibration factor.

7. The method of claim 2, wherein determining at least one performance measure for each of a plurality of documents in the documents database includes determining an off-line site-visit-based performance measure for a respective document, including:

determining a frequency of being detected by the request server for each of a plurality of mobile devices impressed with the respective document using data in the requests database;

dividing the plurality of mobile devices into multiple of frequency groups so that mobile devices in a respective frequency group have determined frequencies in a respective range;

determining a site visit rate (SVR) for each frequency group using data in the requests database, including determining a total number of mobile devices in the frequency group and a number of mobile devices in the frequency group that are associated with processed requests including location events at one or more places associated with the respective document; and fitting the SVR values of the multiple frequency groups to a model function and to determine a convergence value for the model function, wherein the off-line site-visit-based performance measure for the respective document is determined using the convergence value.

8. The method of claim 2, wherein determining at least one performance measure for each of a plurality of documents in the documents database includes determining an off-line site-visit-based performance measure for a respective document, including:

identifying qualified mobile devices, each qualified mobile device is associated with at least one request in the requests database, the at least one request including location features and non-location data that meet preset criteria for the respective document;

identifying exposed mobile devices using data in the events database, each exposed mobile device having been impressed with the respective document;

selecting a test group of mobile devices from the exposed mobile devices;

selecting a control group of mobile devices from a portion of the qualified mobile devices that have not been impressed with the respective document;

determining a first visitation rate for the test group of mobile devices;

determining a second visitation rate for the second group of mobile devices;

determining a lift measure from the first visitation rate and the second visitation rate; and determining the off-line site-visit-based performance measure for the respective document using at least the lift measure.

9. The method of claim 1, further comprising:

determining feature vectors corresponding, respectively to a group of mobile devices based on location history of the group of mobile devices during an observation window of time, the location history being derived from processed requests associated with each of the group of mobile devices in the requests database;

determining target values corresponding, respectively, to the group of mobile devices, each target value indicating whether a corresponding mobile device has visited one or more places associated with the first document during a training window of time;

training an estimation model to predict a probability of visiting one or more places associated with the first document for any particular mobile device using the feature vectors and the target values;

determining a first feature vector for the first mobile device based on location history of the first mobile device during a first window of time, the location history being derived from processed requests associated with the first mobile device in the requests database; and applying the estimation model to the first feature vector to obtain a first probability of visiting the one or more places for the first mobile device, wherein the off-line site visit projection is determined using the first probability.

10. The method of claim 9, wherein the feature vector for each respective mobile device including a set of features corresponding, respectively, to a set of documents in the document database.

11. The method of claim 1, wherein the one or more databases further includes a geo-block database storing therein identifications and definitions of a plurality of geo-blocks, each of the plurality of geo-blocks being a geographical region having one or more natural boundaries and having a predetermined site-visit rate, wherein the first request includes location data related to a first geo-block among the plurality of geo-blocks, and wherein the off-line site visit projection is determined based at least on a site visit rate for the first geo-block.

12. The method of claim 11, further comprising determining the site visit rate for each respective geo-block of the plurality of geo-blocks, including: determining, using data in the requests database, a ratio of a number of unique mobile devices having visited both the respective geo-block and one or more places associated with the first document to a number of unique mobile devices having visited the respective geo-block.

13. A system for information delivery to mobile devices via a packet-based network, comprising:
one or more databases, the one or more databases including a requests database, a documents database and an events database, the requests database storing therein processed information requests associated with mobile devices communicating with the packet-based network, the documents database storing therein documents for transmitting to certain mobile devices in response to associated information requests, the events database storing therein impression events and click/call events, each impression event being related to a certain document having been impressed on a certain mobile device, each click/call event being related to a click made on an impressed document;
at least one processor having access to the one or more databases; and
memory storing therein program instructions, which, when executed by the at least one processor, cause the at least one processor to perform a method comprising:
receiving a real-time indication of a first impression event indicating a first document having been impressed on a first mobile device in response to a first request associated with the first mobile device;
determining a pricing model associated with the first document;
in response to the pricing model being impression-based, adjusting a budget associated with the first document based on the first impression event;
in response to the pricing model being click/call-based, determining whether a click/call event associated with the first impression event occurs subsequent to the first impression event, and in response to receiving an indication that the click/call event associated with the first impression event having occurred, adjusting a budget associated with the first document based on the click/call event associated with the first impression event; and
in response to the pricing model being off-line site-visit-based, determining an off-line site visit projection and adjusting a budget associated with the first document based on the off-line site visit projection.

14. The system of claim 13, wherein the method performed by the at least one processor further comprises:
determining at least one performance measure for each of a plurality of documents in the documents database using at least data in one or both of the requests database and events database, the plurality of documents including the first document, the at least one performance measure including at least one of an impression-based performance measure, a click/call-based performance measure, and an off-line site-visit-based performance measure, the plurality of documents including one or more documents using off-line site-visit-based pricing model and having off-line site-visit-based performance measures.

15. The system of claim 14, wherein the method performed by the at least one processor further comprises:
before receiving the indication of the first impression event:
receiving the first request associated with the first mobile device, the first request including first location data and first non-location data derived from signals transmitted by the first mobile device;
determining first location features based at least on the first location data;
building a search query based on at least some of the first location features and the first non-location data;
searching the documents database using the search query to output one or more matching documents, the one or more matching documents including the first document;
selecting the first document among the one or more matching documents to fulfill the first request based least in part on one or more performance measures of the one or more matching documents; and
transmitting data related to the first document to the packet-based network, wherein the first location features include identification of one or more places where the first mobile device is determined to be at a time of the first request, and wherein the first document is associated with at least one of the one or more places.

16. The system of claim 14, wherein determining at least one performance measure for each of a plurality of documents in the documents database includes determining an off-line site-visit-based performance measure for a respective document, including:
determining, using data in the events database, a first number of mobile devices that have been impressed with the respective document during an exposure time window;
determining, using data in the requests database, a second number of mobile devices that have visited one or more places associated with the respective document during an attribution time window corresponding to the exposure time window; and
determining the off-line site-visit-based performance measure for the respective document using at least the first number and the second number.

17. The system of claim 14, wherein determining at least one performance measure for each of a plurality of documents in the documents database includes determining an off-line site-visit-based performance measure for a respective document, including:
determining a frequency of being detected by the request server for each of a plurality of mobile devices impressed with the respective document using data in the requests database;
dividing the plurality of mobile devices into multiple of frequency groups so that mobile devices in a respective frequency group have determined frequencies in a respective range;
determining a site visit rate (SVR) for each frequency group using data in the requests database, including determining a total number of mobile devices in the frequency group and a number of mobile devices in the frequency group that are associated with processed requests including location events at one or more places associated with the respective document; and
fitting the SVR values of the multiple frequency groups to a model function and to determine a convergence value for the model function, wherein the off-line site-visit-based performance measure for the respective document is determined using the convergence value.

18. The system of claim 14, wherein determining at least one performance measure for each of a plurality of documents in the documents database includes determining an off-line site-visit-based performance measure for a respective document, including:
- identifying qualified mobile devices, each qualified mobile device is associated with at least one request in the requests database, the at least one request including location features and non-location data that meet preset criteria for the respective document;
- identifying exposed mobile devices using data in the events database, each exposed mobile device having been impressed with the respective document;
- selecting a test group of mobile devices from the exposed mobile devices;
- selecting a control group of mobile devices from a portion of the qualified mobile devices that have not been impressed with the respective document;
- determining a first visitation rate for the test group of mobile devices;
- determining a second visitation rate for the second group of mobile devices;
- determining a lift measure from the first visitation rate and the second visitation rate; and
- determining the off-line site-visit-based performance measure for the respective document using at least the lift measure.

19. The system of claim 13, wherein the method performed by the at least one processor further comprises:
- determining feature vectors corresponding, respectively to a group of mobile devices based on location history of the group of mobile devices during an observation window of time, the location history being derived from processed requests associated with each of the group of mobile devices in the requests database;
- determining target values corresponding, respectively, to the group of mobile devices, each target value indicating whether a corresponding mobile device has visited one or more places associated with the first document during a training window of time;
- training an estimation model to predict a probability of visiting one or more places associated with the first document for any particular mobile device using the feature vectors and the target values;
- determining a first feature vector for the first mobile device based on location history of the first mobile device during a first window of time, the location history being derived from processed requests associated with the first mobile device in the requests database; and
- applying the estimation model to the first feature vector to obtain a first probability of visiting the one or more places for the first mobile device and
- wherein the off-line site visit projection is determined using the first probability;
- wherein the feature vector for each respective mobile device including a set of features corresponding, respectively, to a set of documents in the document database.

20. The system of claim 13, wherein the one or more databases further includes a geo-block database storing therein identifications and definitions of a plurality of geo-blocks, each of the plurality of geo-blocks being a geographical region having one or more natural boundaries and having a predetermined site-visit rate, wherein the first request includes location data related to a first geo-block among the plurality of geo-blocks, and wherein the off-line site visit projection is determined based at least on a site visit rate for the first geo-block, and wherein the method performed by the at least one processor further comprises:
- determining the site visit rate for each respective geo-block of the plurality of geo-blocks, including: determining, using data in the requests database, a ratio of a number of unique mobile devices having visited both the respective geo-block and one or more places associated with the first document to a number of unique mobile devices having visited the respective geo-block.

* * * * *